(12) United States Patent
Ishibashi et al.

(10) Patent No.: US 7,409,554 B2
(45) Date of Patent: Aug. 5, 2008

(54) DATA PROCESSING SYSTEM, MEMORY DEVICE, DATA PROCESSING UNIT, AND DATA PROCESSING METHOD AND PROGRAM

(75) Inventors: Yoshihito Ishibashi, Tokyo (JP);
Susumu Kusakabe, Tokyo (JP);
Hideaki Watanabe, Tokyo (JP)

(73) Assignee: Sony Corporation (JP)

( * ) Notice: Subject to any disclaimer, the term of this patent is extended or adjusted under 35 U.S.C. 154(b) by 743 days.

(21) Appl. No.: 10/311,766

(22) PCT Filed: Apr. 17, 2002

(86) PCT No.: PCT/JP02/03805

§ 371 (c)(1),
(2), (4) Date: May 21, 2003

(87) PCT Pub. No.: WO02/089048

PCT Pub. Date: Nov. 7, 2002

(65) Prior Publication Data

US 2004/0006695 A1    Jan. 8, 2004

(30) Foreign Application Priority Data

Apr. 23, 2001   (JP) ............................. 2001-123890
Aug. 20, 2001   (JP) ............................. 2001-249588

(51) Int. Cl.
*H04L 9/00* (2006.01)

(52) U.S. Cl. ................ 713/175; 713/156; 713/157; 713/159; 713/172; 713/173; 713/176; 726/9; 726/10; 726/20

(58) Field of Classification Search ............ 713/172, 713/173, 175, 176, 156, 157, 159; 726/9, 726/10, 20
See application file for complete search history.

(56) References Cited

U.S. PATENT DOCUMENTS

| 4,855,578 A | 8/1989 | Hirokawa et al. |
| 4,912,310 A | 3/1990 | Uemura et al. |
| 6,005,942 A * | 12/1999 | Chan et al. ................. 713/187 |
| 6,112,985 A | 9/2000 | Weinlaender |
| 6,317,832 B1 * | 11/2001 | Everett et al. ............... 713/172 |
| 7,046,810 B2 * | 5/2006 | Takada et al. ............... 380/284 |
| 7,058,804 B1 * | 6/2006 | Akashika et al. ............ 713/156 |

FOREIGN PATENT DOCUMENTS

| EP | 0 440 800 A1 | 8/1991 |
| FR | 2 661 996 | 11/1991 |
| JP | 61-110266 A1 | 5/1986 |
| JP | 2000-276568 A1 | 10/2000 |

* cited by examiner

*Primary Examiner*—Kimyen Vu
*Assistant Examiner*—Beemnet W Dada
(74) *Attorney, Agent, or Firm*—Lerner, David, Littenberg, Krumholz & Mentlik, LLP

(57) ABSTRACT

To provide an improved management structure of memory devices storing service-use applications. A card for a memory device applied to use various services is provided as one child card or more corresponding to each of the services, a parent card-stores data for child-card issue management, and the child-card issue processing is executed based on the parent card, such as parent card authentication. An issue certificate having a parent-card digital signature is stored in the child card, the issue certificate contains a service code and a child-card identification, and thus it becomes possible to confirm a service set in the child card based on the issue certificate as the parent-card signature data.

34 Claims, 25 Drawing Sheets

FIG. 5

| |
|---|
| VERSION NUMBER |
| CERTIFICATE SERIAL-NUMBER (SN) |
| SIGNATURE ALGORITHM IDENTIFICATION FIELD: ALGORITHM AND PARAMETER |
| NAME OF ISSUE AUTHORITY (CERTIFICATE AUTHORITY) |
| CERTIFICATE VALIDATED DATE FIELD: START DATE & TIME, END DATE & TIME |
| PUBLIC KEY CERTIFICATE USER IDENTIFICATION (ID) |
| USER PUBLIC KEY |
| OPTION AREA |
| ISSUE AUTHORITY (CERTIFICATE AUTHORITY) SIGNATURE |

FIG. 10
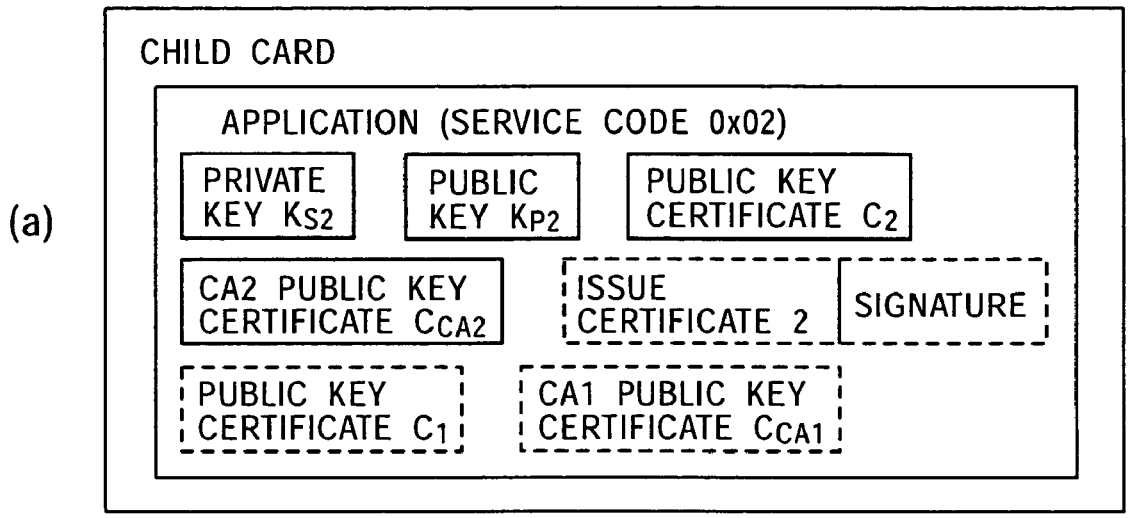
(a)
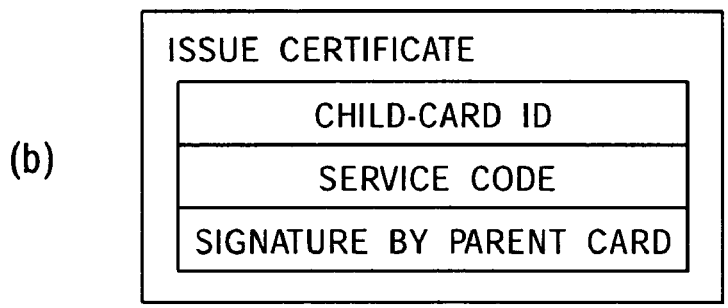
(b)
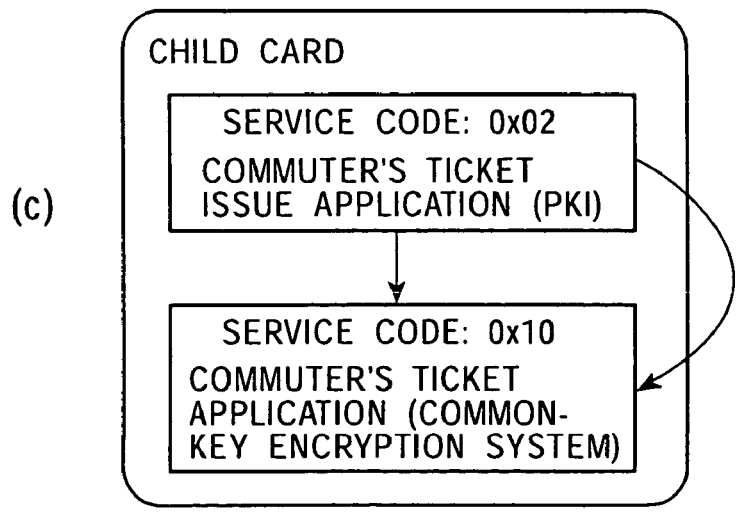
(c)

US 7,409,554 B2

DATA PROCESSING SYSTEM, MEMORY DEVICE, DATA PROCESSING UNIT, AND DATA PROCESSING METHOD AND PROGRAM

TECHNICAL FIELD

The present invention relates to a data processing system, a memory device, a data processing unit, and a data processing method and program. More particularly, the present invention relates to a data processing system, a memory device, a data processing unit, and a data processing method and program in which cards are tied up as a plurality of memory devices with having a parent-child relationship, child-cards available for various services are issued under the control of a parent card, card issue and card use processing with executing authentication processing are achieved, and elimination of illegal card use, providing services and use configuration with high security-level are achieved.

BACKGROUND ART

In recent years, memory devices such as IC cards, etc. are used in various services, for example, for credit cards, bank money cards, hospital medical care cards, employee-ID cards, membership cards of various organizations, or electronic money systems, commuter' tickets, etc. IC cards includes a CPU (Central Processing Unit) which has an operation processing function and a memory which stores necessary data, etc. for processing, and performs sending and receiving data with electrically contacted with a predetermined reader/writer (R/W) or non-contacted by utilizing electromagnetic waves, etc.

When using IC cards for electronic money systems and security systems, security, such as data secrecy and prevention of IC card forgery, has importance. In general, personal information is often stored in the memory of the cards, and thus it is a big problem how to prevent personal information from being read illegally from the cards.

Also, when one user has a plurality of cards corresponding to various services, management of these cards is left to each individual. Thus it is anticipated that the possibility of losing cards and illegal use of other person's lost cards increase with increasing number of cards.

A description will be given of the memory structure example of the card-type memory device such as the conventional IC card with reference to the drawings. The memory in FIG. 24 illustrates the memory structure example of the device available, for example, for an electronic money. As shown in FIG. 24, the memory area is mainly divided into three parts. Specifically, the parts are a data area, a memory management area, and a system area.

The data area stores data based on "data structure" stored at the top of each data, for example, a user name, an address, a telephone number, an amount, a memo, and a log. The memory management area stores a storage address, an access method, an access authentication key, etc. for accessing each data in the data area. For example, the example shows that an access to data 1 (user name) in the data area is allowed for read only by using an access authentication key (1233 . . . ). Also, the system area stores a device identification (ID), a memory management key which is an authentication key for obtaining a memory area in the data area, and so on.

The data area of the memory device shown in FIG. 24 can be divided into a plurality of areas. These divided areas can be managed by different service entities, for example, in the case of electronic money, the divided areas can be managed individually by different electronic-money service providing entities (for example, a plurality of different banks). Each divided area data is read, written (ex. update of balance data) by a user, for example, a reader/writer (dedicated reader/writer or PC, etc.), which is a device access machine installed at a store selling products using electronic money in addition to individual service providing entities.

Next, a description will be given of the memory access method for a memory device having a plurality of data area using FIG. 25. The reader/writer on the left side in FIG. 25 is a reader/writer (R/W) for memory access, and is composed of a dedicated R/W or a PC. The reader/writer (R/W) for memory access is provided with a secure NVRAM for holding an access authentication key. In order to access data area of a secure device using a R/W, a device ID is read from the secure device first. Next, in the R/W, an authentication key is generated using an access authentication key and the device ID, and mutual authentication is executed with the secure device using the generated authentication key. After succeeding in mutual authentication, the R/W performs a predetermined access on the data in the data area corresponding to the access authentication key.

At this time, accessing is performed in accordance with the access method defined in the memory management area. For example, when succeeding in access authentication for decrement of data 4 (amount data), it becomes possible to decrement data in data 4.

IC cards have various use forms, for example, an above-described medical care card used in a hospital, an employee-ID card used in an organization such as a company, a commuter's ticket, etc. in addition to an electronic money described above. Thus, the processing executed on an IC card differs depending on the service providing entity (service provider) which provides each service. The application programs necessary for these processing are stored in a memory in an IC card, and when accessing a reader/writer under the control of each service provider, each program is executed to read or write data stored in the IC card.

A memory card, which stores such various data and are capable of executing various applications, stores various personal information as described above. Each service requires different personal information. If one piece of card is formed to be used for all the services, the card becomes necessary to store various personal information, such as a bank account number, an employee-ID number, or a medical history in addition to every personal information, for example, an address, a name, a telephone number, etc. Accumulation of personal information in such a way causes a problem of external exposure of personal information in the case of a card loss or a theft.

Also, in recent years, crimes or illegal procedures using cards, in which a person who is not authorized for acquiring a legitimate card receives the card by pretending a legitimate card acquiring person by making a card issue request using an illegal procedure, etc., have been increased.

DISCLOSURE OF INVENTION

In consideration of personal information being externally exposed from a card, it is not preferable to accumulate much personal information in a card which is always carried and used in a daily life. Specifically, it is preferable that a card carried and used in a daily life stores the minimum information corresponding to the service in which the card is used.

Also, in order to solve the problem of illegal card issue procedures by a person who is not authorized for acquiring a card, it is necessary to construct a management structure for card issue processing procedures.

The present invention is made in view of the above problems, and an object is to reduce external exposure of personal information from a card loss, etc. by forming a structure in which a parent card is issued to each user through a rigid review, and child cards are issued in order to use applications corresponding to various services under the management of the parent card. Also, another object is to provide a data processing system, a memory device, a data processing unit, and a data processing method and program which are capable of managing a card issue processing procedure.

According to a first aspect of the present invention, there is provided a data processing system including:

a first memory device which includes data storage means and data control means; and a second memory device which includes data storage means and data control means, wherein the first memory device stores an issue-management table concerning the second memory device, the second memory device stores an application program which executes data processing to which the second memory device is applied, and also stores an issue certificate having a digital signature by a private key peculiar to the first memory device for data including a service code for identifying the application program, and issue processing of the second memory device or execution processing of the issue processing of the issue certificate for the second memory device is performed based on the issue-management table stored in the first memory device.

Further, in an embodiment of the data processing system of the present invention, the first memory device may store a public key and a private key which are applicable to a public-key cryptography, and an issue-processing control program of the second memory device, and an issue may be made by a management device of the first memory device management entity, the second memory device may store the public key and the private key which are applicable to the public-key cryptography on the condition that authentication by the public-key system of the first memory device may be approved, an application program which executes data processing in which the second memory device is applied may be stored, and an issue may be made by a management device of the second memory device management entity.

Further, in an embodiment of the data processing system of the present invention, the first memory device may store an execution control application program of the second memory device issue processing, or the issue certificate issue processing, and performs control of the second memory device issue processing, or the issue certificate issue processing in accordance with the application program.

Further, in an embodiment of the data processing system of the present invention, the issue-management table stored in the first memory device may be a table on which the service code, an issue upper limit number of the second memory device or the issue certificates, and a number of already issued correspond with each other, the issue processing of the second memory device or the issue certificate may be executed on the condition that data on the issue management table corresponding to the service code of the issue processing holds: number of already issued<number of issue upper limit.

Further, in an embodiment of the data processing system of the present invention, the second memory device issue processing or issue processing of the issue certificate may be executed on the condition of at least either authentication between the first memory device and the second memory device by a public-key cryptography is approved, or authentication between the first memory device and a device for executing the issue processing of the second memory device, or issue processing of the issue certificate by a public-key cryptography is approved.

Further, in an embodiment of the data processing system of the present invention, the second memory device issue processing or issue processing of the issue certificate may be executed on the condition that the memory device identification (ID) of the first memory device is not registered in a revocation list storing an identification (ID) of an illegal device.

Further, in an embodiment of the data processing system of the present invention, the second memory device issue processing or issue processing of the issue certificate may be executed on the condition of at least either authentication between the second memory device and the first memory device by a public-key cryptography is approved, or authentication between the second memory device and a device for executing the issue processing of the second memory device, or issue processing of the issue certificate by a public-key cryptography is approved.

Further, in an embodiment of the data processing system of the present invention, the issue certificate stored in the second memory device may have a digital signature by a private key peculiar to the first memory device for data which includes a service code for identifying data processing to which the second memory device is applied, and an identification (ID) of the second memory device.

Further, in an embodiment of the data processing system of the present invention, the second memory device may store an application program which executes a service corresponding to a service code identifying data processing to which the second memory device is applied together with the service code.

Further, in an embodiment of the data processing system of the present invention, the second memory device may store an application program which executes a service corresponding to the service code, the application program includes a lower application program which executes data processing on the condition of authentication approval by a common-key system, and an upper application program which performs execution control of the lower application program.

Further, in an embodiment of the data processing system of the present invention, the second memory device may store an application program which executes a service corresponding to the service code, the second memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition of the authentication approval.

Further, in an embodiment of the data processing system of the present invention, the second memory device may store an application program which executes a service corresponding to the service code, the second memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition that the authentication is approved and the memory device identification (ID) of the memory device is not registered in a revocation list storing an identification (ID) of an illegal device.

Further, in an embodiment of the data processing system of the present invention, the second memory device may store an application program which executes a service corresponding to the service code, the second memory device has a lower application program which executes data processing on the condition of authentication approval by a common-key system, and an upper application program which performs execution control of the lower application program, the upper application program executes authentication processing between the second memory device and an entity management device, which is a service providing entity corresponding to the service code, by a public-key system, and controls to enable execution of the lower application program on the condition that the authentication is approved and a service code corresponding to the upper application program and a service code stored in the issue certificate are identical.

Further, in an embodiment of the data processing system of the present invention, the second memory device may store an application program which executes a service corresponding to the service code, the second memory device has a lower application program which executes data processing on the condition of authentication by a common-key system, and an upper application program which performs execution control of the lower application program, the upper application program executes authentication processing between the second memory device and an entity management device, which is a service providing entity corresponding to the service code, by a public-key system, and controls to enable execution of the lower application program on the condition that the authentication is approved.

Further, in an embodiment of the data processing system of the present invention, the second memory device may store an application program which executes a service corresponding to the service code, the second memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and the management device controls to enable execution of the lower application program on the condition that the authentication is approved and the memory device identification (ID) of the memory device is not registered in a revocation list storing an identification (ID) of an illegal device.

Further, in an embodiment of the data processing system of the present invention, the second memory device may store an application program which executes a service corresponding to the service code, the second memory device has a lower application program which executes data processing on the condition of authentication approval by a common-key system, and an upper application program which performs execution control of the lower application program, the upper application program executes authentication processing between the second memory device and an entity management device, which is a service providing entity corresponding to the service code, by a public-key system, and the management device controls to enable execution of the lower application program on the condition that the authentication is approved and a service code corresponding to the upper application program and a service code stored in the issue certificate are identical.

Further, in an embodiment of the data processing system of the present invention, the first memory device may perform execution control of issue processing of a plurality of the second memory devices, or issue certificate issue processing for the second memory device based on the issue-management table stored in the first memory device.

Further, in an embodiment of the data processing system of the present invention, the first memory device may store a public key, a private key, and a public-key certificate which are applied to a public-key cryptography, and also may store a public-key certificate or a public-key of a certificate authority, which is the public-key certificate issue entity.

Further, in an embodiment of the data processing system of the present invention, the second memory device may store a public key, a private key, and a public-key certificate which are applied to a public-key cryptography, and also may store a public-key certificate or a public-key of a certificate authority, which is the public-key certificate issue entity.

Further, in an embodiment of the data processing system of the present invention, the second memory device may store a plurality of different application programs corresponding to a plurality of different service codes, and also may store a plurality of issue certificates corresponding to a plurality of application programs.

Further, in an embodiment of the data processing system of the present invention, the second memory device may store a plurality of different application programs corresponding to a plurality of different service codes, and also stores a plurality of issue certificates corresponding to a plurality of application programs, the plurality of issue certificates are certificates on which issue processing is performed based on an issue-management table of a same first memory device, and have a digital signature by a private key peculiar to a same first memory device.

Further, in an embodiment of the data processing system of the present invention, the second memory device may store a plurality of different application programs corresponding to a plurality of different service codes, and also stores a plurality of issue certificates corresponding to a plurality of application programs, the plurality of issue certificates are certificates on which issue processing is performed based on an issue-management table of a different first memory device, and have a digital signature by a private key peculiar to a different first memory device.

Furthermore, according to a second aspect of the present invention, there is provided a memory device having data storage means and data control means, the memory device is defined as a parent memory device, the device including: an execution control program for a child-memory device issue processing or for issue processing of an issue certificate for a child-memory device; and an issue-management table concerning the child-memory device, which are stored in the device.

Further, in an embodiment of the memory device of the present invention, the issue-management table may be a table on which a service code for identifying an application program for executing data processing to which the memory device is applied, and the child memory device or an issue upper limit number of the issue certificates, and a number of already issued correspond with each other, the issue processing of the memory device or the issue certificate is executed on the condition that data on the issue management table corresponding to a service code of the issue processing holds: a number of already issued<a number of issue upper limit.

Further, in an embodiment of the memory device of the present invention, the parent memory device may execute issue processing of the child memory device, or issue processing of the issue certificate on the condition of at least either authentication between the parent memory device and the child memory device by a public-key cryptography is approved, or authentication between the parent memory device and a device for executing the issue processing of the child memory device, or issue processing of the issue certificate by a public-key cryptography is approved.

Moreover, according to a third aspect of the present invention, there is provided a memory device having data storage means and data control means, the device including: an application program, which is stored, for executing data processing to which the memory device is applied; and an issue certificate having a digital signature by a private key peculiar to a parent memory device, which is the other memory device, for data including a service code for identifying the application program.

Further, in an embodiment of the memory device of the present invention, the issue certificate may have a digital signature by a private key peculiar to the parent memory device for data which includes a service code for identifying data processing to which the memory device is applied, and an identification (ID) of the memory device.

Further, in an embodiment of the memory device of the present invention, the memory device may store an application program which executes a service corresponding to the service code, the application program includes a lower application program which executes data processing on the condition of authentication approval by a common-key system, and an upper application program which performs execution control of the lower application program.

Further, in an embodiment of the memory device of the present invention, the memory device may store an application program which executes a service corresponding to the service code, the memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition of the authentication approval.

Further, in an embodiment of the memory device of the present invention, the memory device may store an application program which executes a service corresponding to the service code, the memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition that the authentication is approved and the memory device identification (ID) of the memory device is not registered in a revocation list storing an identification (ID) of an illegal device.

Further, in an embodiment of the memory device of the present invention, the memory device may store an application program which executes a service corresponding to the service code, the memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition that the authentication is approved and a service code corresponding to the upper application program and a service code stored in the issue certificate are identical.

Furthermore, according to a fourth aspect of the present invention, there is provided a data processing unit capable of communication with a memory device, wherein authentication processing is executed with the first memory on the condition that at least either the second memory device issue processing, or the second memory issue certificate issue processing may be executed.

Further, in an embodiment of the data processing unit of the present invention, processing for transferring an issue certificate having a digital signature by a private-key peculiar to the first memory device to the second memory device may be executed.

Further, in an embodiment of the data processing unit of the present invention, the second memory device issue processing or issue processing of the issue certificate may be executed on the condition that the memory device identification (ID) of the first memory device is not registered in a revocation list storing an identification (ID) of an illegal device.

Further, in an embodiment of the data processing unit of the present invention, there is provided a data processing unit capable of communication with a memory device, wherein authentication processing is executed with the memory device by a public-key system, a public certificate, which is stored in the memory device, of a parent memory device, which is the other memory device, is obtained on the condition of the authentication approval, validity check of the parent memory device based on the public-key certificate is executed by checking against a revocation list, which is an illegal device identification list, and application control is performed of the application stored in the memory device on the condition of validity check of the parent memory device.

Furthermore, according to a fifth aspect of the present invention, there is provided a data processing unit capable of communication with a memory device, wherein authentication processing is executed with the memory device by a public-key system, a public certificate, which is stored in the memory device, of a parent memory device, which is the other memory device, is obtained on the condition that a service code in the issue certificate and a service code corresponding to an application stored in the memory device are identical.

Further, in an embodiment of the data processing unit of the present invention, the data processing unit may execute validation of a signature by a private key peculiar to the parent memory device, and performs obtaining processing to the service code in the issue certificate on the condition of authentication approval.

Furthermore, according to a sixth aspect of the present invention, there is provided a data processing method for executing issue processing of a second memory device, or storage processing of an issue certificate for a second memory device based on a first memory device storage data, the method including:

determining step of whether or not a second memory device issue processing based on an issue-management table, which is stored in the first memory device, concerning the second memory device, or storage processing of an issue certificate for a second memory device is allowed; and creating step of an issue certificate on which a digital signature is executed by a private-key peculiar to the first memory device for data including a service code for identifying the application program stored in a second memory device, and storing step of the certificate in the second memory device.

Further, in an embodiment of the data processing method of the present invention, the issue-management table stored in the first memory device may be a table on which the service code and the second memory device or an issue upper limit number of the issue certificates, and a number of already issued correspond with each other, the issue processing of the second memory device or the issue certificate is executed on the condition that data on the issue management table corresponding to a service code of the issue processing holds: a number of already issued<a number of issue upper limit.

Further, in an embodiment of the data processing method of the present invention, the second memory device issue processing or issue processing of the issue certificate may be executed on the condition of at least either authentication between the first memory device and the second memory device by a public-key cryptography may be approved, or authentication between the first memory device and a device for executing the issue processing of the second memory device, or issue processing of the issue certificate by a public-key cryptography may be approved.

Further, in an embodiment of the data processing method of the present invention, the second memory device issue processing or issue processing of the issue certificate may be executed on the condition that the memory device identification (ID) of the first memory device is not registered in a revocation list storing an identification (ID) of an illegal device.

Further, in an embodiment of the data processing method of the present invention, the second memory device issue processing or issue processing of the issue certificate may be executed on the condition of at least either authentication between the parent memory device and the child memory device by a public-key cryptography is approved, or authentication between the first memory device and a device for executing the issue processing of the second memory device, or issue processing of the issue certificate by a public-key cryptography is approved.

Further, in an embodiment of the data processing method of the present invention, the issue certificate stored in the second memory device may have a digital signature by a private key peculiar to the first memory device for data which includes a service code for identifying data processing to which the second memory device is applied, and an identification (ID) of the second memory device.

Moreover, according to a seventh aspect of the present invention, there is provided a data processing method in a data processing unit capable of communication with a memory device, wherein authentication processing is executed with the first memory on the condition that at least either the second memory device issue processing, or the second memory issue certificate issue processing is executed.

Further, in an embodiment of the data processing method of the present invention, the data processing unit may further execute processing for transferring an issue certificate having a digital signature by a private-key peculiar to the first memory device to the second memory device.

Further, in an embodiment of the data processing method of the present invention, the data processing unit may further execute the second memory device issue processing or issue processing of the issue certificate on the condition that the memory device identification (ID) of the first memory device is not registered in a revocation list storing an identification (ID) of an illegal device.

Furthermore, according to an eighth aspect of the present invention, there is provided a data processing method in a data processing unit capable of communication with a memory device, wherein authentication processing is executed with the memory device by a public-key system, a public certificate, which is stored in the memory device, of a parent memory device, which is the other memory device, is obtained on the condition of the authentication approval, validity check of the parent memory device based on the public-key certificate is executed by checking against a revocation list, which is an illegal device identification list, and application control is performed of the application stored in the memory device on the condition of validity check of the parent memory device.

Moreover, according to a ninth aspect of the present invention, there is provided a data processing method in a data processing unit capable of communication with a memory device, wherein authentication processing is executed with the memory device by a public-key system, a public certificate, which is stored in the memory device, of a parent memory device, which is the other memory device, is obtained on the condition that a service code in the issue certificate and a service code corresponding to an application stored in the memory device are identical.

Further, in an embodiment of the data processing method of the present invention, the data processing unit may execute validation of a signature by a private key peculiar to the parent memory device, and performs obtaining processing of the service code in the issue certificate on the condition of authentication approval.

Further, according to a tenth aspect of the present invention, there is provided a program which executes data processing, on a computer system, for executing issue processing of a second memory device, or storage processing of an issue certificate for a second memory device based on a first memory device storage data, the program comprising:

determining step of whether or not a second memory device issue processing based on an issue-management table, which is stored in the first memory device, concerning the second memory device, or storage processing of an issue certificate for a second memory device is allowed; and creating step of an issue certificate on which a digital signature is executed by a private-key peculiar to the first memory device for data including a service code for identifying the application program stored in a second memory device, and storing step of the certificate in the second memory device.

Furthermore, according to an eleventh aspect of the present invention, there is provided a program which executes data processing in a data processing unit capable of communication with a memory device on a computer system, the program including:

execution step of authentication processing with the first memory; and execution step of at least either second memory device issue processing or second memory issue certificate issue processing on the condition of the authentication completion.

Moreover, according to a twelfth aspect of the present invention, there is provided a program which executes data processing in a data processing unit capable of communication with a memory device on a computer system, the program including:

execution step of authentication processing with the memory device by a public-key system;

execution step of obtaining a public certificate, which is stored in the memory device, of a parent memory device, which is the other memory device on the condition of the authentication approval, validity check of the parent memory device based on the public-key certificate is executed by checking against a revocation list, which is an illegal device identification list; and application control step of the application stored in the memory device on the condition of validity check of the parent memory device.

Further, according to a thirteenth aspect of the present invention, there is provided a program which executes data processing in a data processing unit capable of communication with a memory device on a computer system, the program including:

execution step of authentication processing with the memory device by a public-key system; and execution step of obtaining a public certificate, which is stored in the memory device, of a parent memory device, which is the other memory device, on the condition that a service code in the issue certificate and a service code corresponding to an application stored in the memory device are identical.

Furthermore, according to a fourteenth aspect of the present invention, there is provided a data processing unit for executing read processing of each public-key certificate from both of a first memory device as a parent card storing a public-key certificate and a second memory device as a child card storing a public-key certificate, and for executing validation processing of each public-key certificate which has been read, wherein on the condition that validity of each memory device is confirmed based on the validation processing, tied information is generated based on the storage information of the first memory device and the second memory device, and storage processing is executed of the generated tied information and digital signature data for the tied information in the second memory device as the child card.

Further, in an embodiment of the data processing unit of the present invention, the data processing unit may generate the tied information in a format of an attribute certificate.

In this regard, the program of the present invention can be provided to, for example, a general purpose computer, on which various programs can be executed, using a medium which is supplied in a computer-readable format, for example, a storage medium, such as CD, FD, MO, etc. Also, the program can be supplied via transmission medium such as a network.

Such a program defines execution of various functions of the system under the control of processor based on reading the program, and works for cooperation on the system to have the same effect as the other aspect of the present invention.

Other objects, features, and advantages of the present invention will become apparent from the following detailed description of embodiments of the present invention with reference to the accompanying drawings. In this regard, a system in the present specification means a logically assembled components of a plurality of devices, and each component device is not always contained in a same housing.

BRIEF DESCRIPTION OF THE DRAWINGS

FIG. 5 is a diagram illustrating the format of the public-key certificate.

FIG. 10 is a diagram illustrating the configuration example of the child-card of the present invention.

BEST MODE FOR CARRYING OUT THE INVENTION

Embodiments of the present invention will be described in detail with reference to the drawings.

[System Overview]

Figure 1:
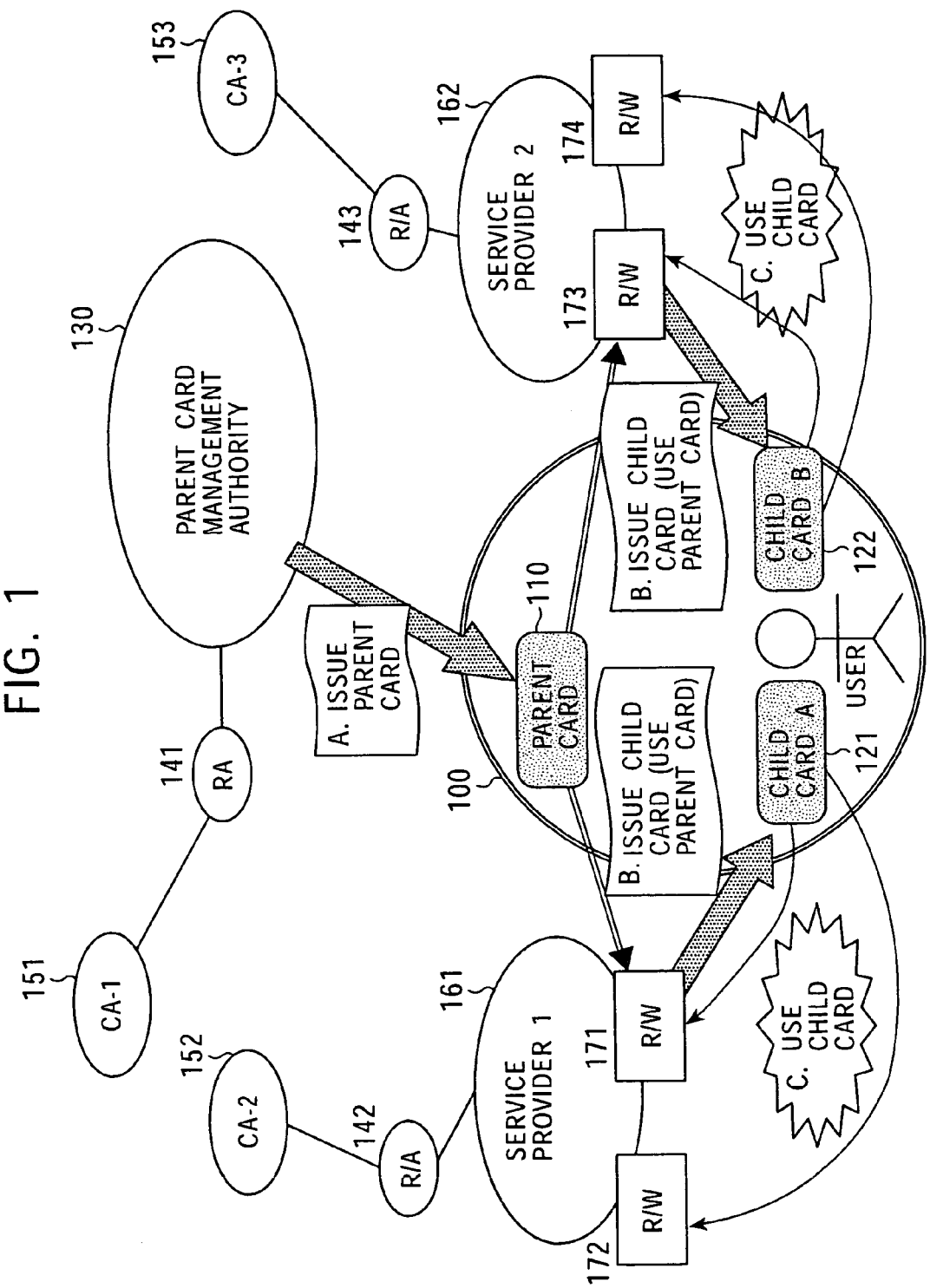
FIG. 1 is a system configuration schematic diagram illustrating the overview of the system configuration of the present invention.

First, FIG. 1 is a diagram illustrating the overview of the issue and use processing of a parent card as a first memory device and a child card as a second memory device which are used in the data management system of the present invention.

A description will be given of the data processing system in which the parent card as the first memory device and the child card as the second memory device are used with reference to FIG. 1. In FIG. 1, first, a user 100 requests issue processing of a parent card 110 to a parent card (first memory device) management authority 130, and submits necessary information for a parent card issue to the parent card management authority 130. The parent card management authority 130 registers, for example, personal information submitted from the user, or personal information obtained from the other databases in its own management database. Also, the authority stores personal information, the other necessary data, and programs in a parent card, executes generation processing of the parent card, and issues the generated parent card 110 to the user. The parent card 110 stores user personal information, an application program which controls issue processing of a child card (second memory device), and an issue-history registration table as a child card issue-management table. Furthermore, the card stores public-key system key data, that is, a public key, a private key, a public-key certificate, etc. The data structure and the like in the card will be described in detail in the below.

The user 100 who has received the parent card 110 issued by the parent-card management authority 130 can perform issue processing procedure of child cards 121 and 122 based on the received parent card 110. The child cards 121 and 122 are cards which are applicable to various services, for example, electronic money, hospital medical care cards, commuter's ticket for railroads and buses, etc., and is carried in a daily life. On the contrary, the parent card is used only for issuing a child card, etc., and is not necessary to be carried daily. In some cases, the parent card can be deposited in a safety saving location, an agency, and so on.

In order to receive a new service, the user can request issue of the child cards 121 and 122 corresponding to services. The user 100 makes an issue request of the child cards 121 and 122 to a child-card issue agency, that is, an entity equipped with a child-card issue machine.

In FIG. 1, as an entity equipped with a child-card issue machine, a service provider which provides services using the card is assumed. In this regard, a child-card issue agency is not necessarily a service provider, and may be an independent entity which manages issuing a card.

Each service provider, which is an entity equipped with a child-card issue machine in the example in FIG. 1, performs processing for a child-card issue request from the user based on the user's parent card. Specifically, child cards available to be issued to the user are limited to the range defined in the parent card by the parent-card management authority 130.

In the case of a card used for various services provided by a service provider, for example, in the case of a card used for electronic money, a child card is issued as the card storing storage data area of amount data, and various operation processing programs as applications by a child-card issue agency, for example, a service provider. Also, in the case of a card used for a commuter's ticket, data on a use section and a use period are stored, and a program for executing mutual authentication processing with a reader/writer installed at a ticket gate of a station is stored as an application program.

For example, when performing the child-card issue processing at a service provider-1, 161, the user sets the parent card 110 issued by the parent-card management authority 130 in a reader/writer (R/W) 171 as a child-card issue machine in a data readable/writable state, reads a child-card issue processing program from the parent card, determines whether or not the issue-requested child card is permitted to be issued, and issues a child card 121 only when permitted.

In child cards 121 and 122, an application program corresponding to a service to be set in each child card is stored in advance or at a child-card issue processing time. Also, at the time of child-card issue processing, a parent-card's issue certificate used at the child-card issue procedure is stored. Furthermore, key data of a public-key system, that is, a public key, a private key, a public-key certificate, etc. are stored. A detailed description will be later given of the data structure in the card, card issue processing, and use processing.

The public-key certificate to be stored in the parent card is examined at a regulating registration authority (RA) 141, is issued at a certificate authority (CA-1) 151, and is stored in the parent card. Also, the public-key certificate to be stored in the child card is examined at regulating registration authorities (RA) 142 and 143 of a service provider, issued at a certificate authorities (CA-2) 152 and (CA-3) 153, and stored in the child card.

When the user 100 receives a child card by the child card issue processing procedure based on the parent card from the service provider as a child-card issue agency entity equipped with a child-card issue machine, the user 100 becomes possible to receive the service using the child card through reader/writers 171, 172, 173, and 174 which are managed by the service provider corresponding to the child card. Specifically, the user performs data communication between the child cards 121 and 122, and reader/writers 171, 172, 173, and 174 in a contact manner or non-contact manner to receive various services in accordance with applications set in the card.

In this regard, a service includes various processing, for example, if the child card is available for a commuter's ticket, the processing is opening and closing of a gate at automatic ticket gates. If the card is available for electronic money, the processing is payment settlement processing. If the child card is available for employee ID card or membership card, the processing is opening and closing of a passage gate at the building of an organization. If the child card is available for a medical care card, the processing is medical care reception processing.

[Structure of Card]

Figure 2:
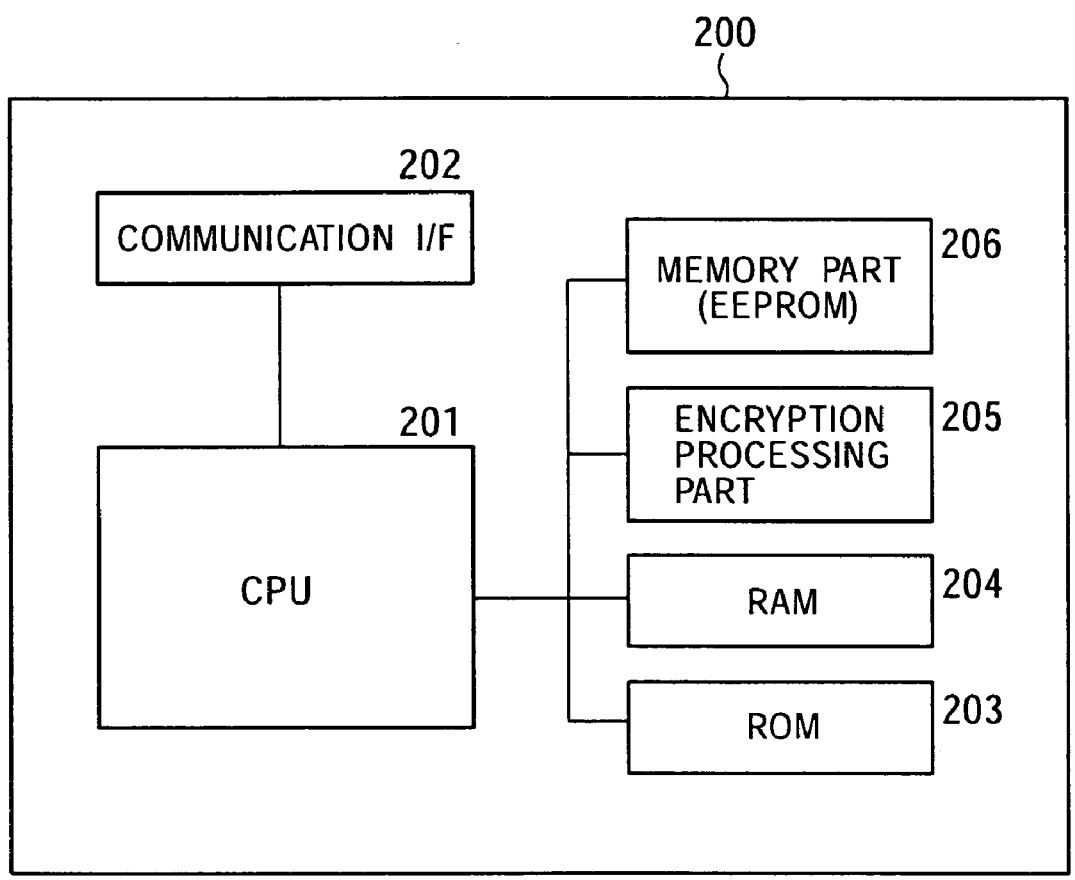
FIG. 2 is a diagram illustrating the configuration example of a card applicable to the present invention.

A description will be given, using FIG. 2, of the structure example of a parent card and a child card which are constituted by a memory device such as an IC card. As shown in FIG. 2, a card 200 includes a CPU (Central Processing Unit) 201 having a program execution function and an operation processing function, a communication interface 202 having a function of communication processing interface with an external devices such as a reader/writer as a device access machines, a ROM (Read Only Memory) 203 storing various programs, for example, encryption processing program to be executed on the CPU 201, a RAM (Random Access Memory) 204 which functions as a load area of the execution program, or a work area for each program processing, an encryption processing part 205 which executes authentication processing with an external device, digital signature generation, validation processing, encryption processing and decryption processing of the stored data, etc., and a memory part 206 which is constituted by, for example, an EEPROM (Electrically Erasable Programmable ROM) storing data corresponding to card specific information including various key data, and programs. The information stored in the memory part 206 will be described in detail later.

[Parent Card Issue Processing]

Next, a description will be given, using FIG. 3, of parent card issue processing which is executed in the parent-card management authority 130 shown in FIG. 1.

Figure 3:
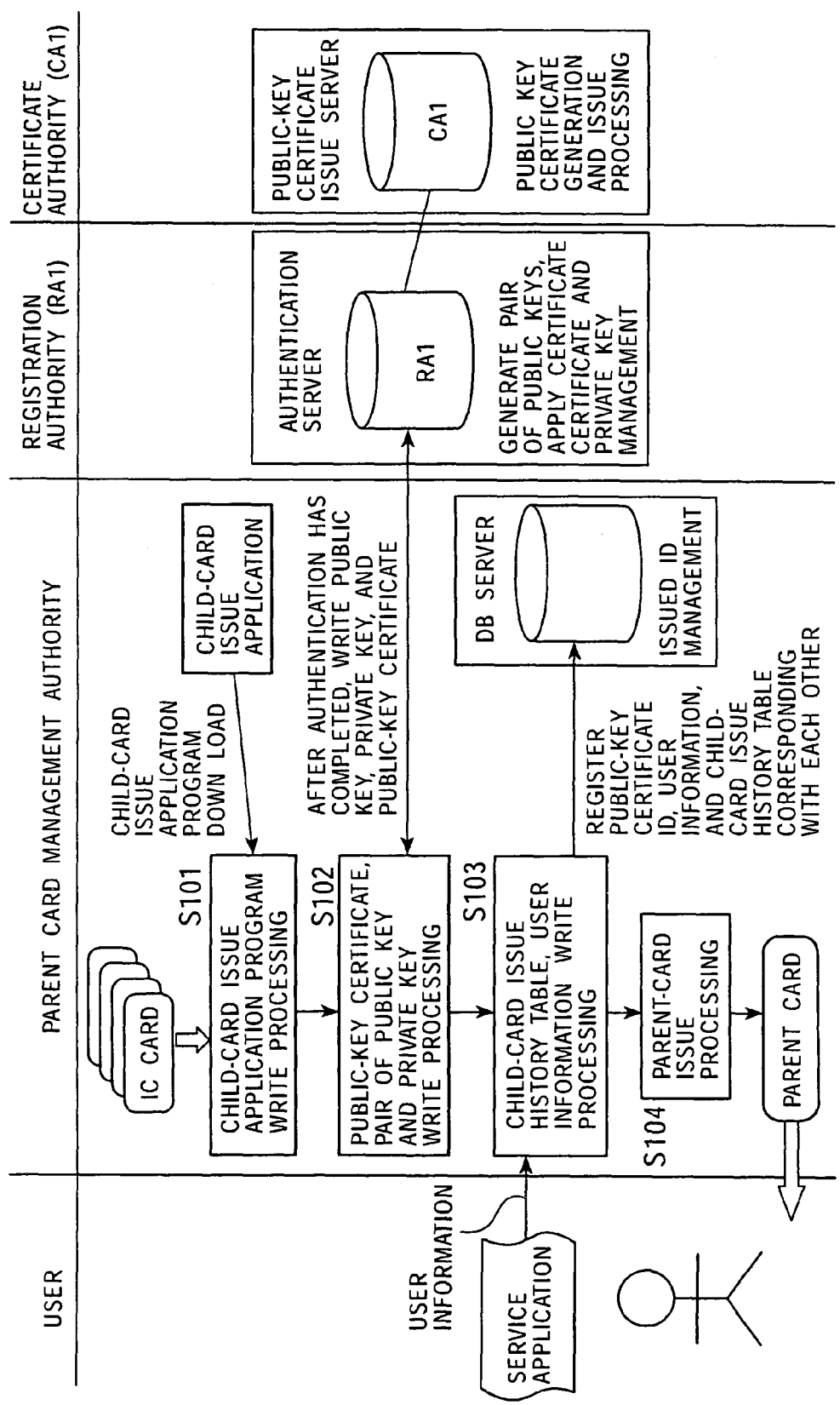
FIG. 3 is a diagram illustrating the parent-card issue processing in the present invention.

In FIG. 3, in sequence from left, each processing is shown as follows: a user who receives a parent card, a parent-card management authority which executes parent-card issue processing, an issue review of public-key certificate, a registration authority (RA1) which executes generation processing of a pair of a public key and a private key, and a certificate authority (CA) which executes issue processing of a public-key certificate.

The parent-card management authority posses a memory device (IC card) as a material for generating a parent card, and generates a parent card by storing necessary data and programs as a parent card in an IC card. First, in step S101 shown in FIG. 3, the parent-card management authority downloads a child-card issue application program to the parent card. The child-card issue application program is a program to be executed in a parent card to enable issue processing of a child card when a user who has a parent card makes an issue request to a child-card issue agency such as a service provider. In this regard, the child-card issue processing is limited by the data on the issue-history table which is a child-card issue management table stored in the parent card. A description will be given of the issue-history table later. In this regard, the child-card issue application program may be read from a parent card to a reader/writer, which is a child-card issue machine of a child-card issue agency, and may be executed by the operation processing part of the reader/writer.

Next, in step S102, the parent-card management authority performs storage processing of the public key, the private key, and the public-key certificate corresponding to the parent card. A pair of a public key and a private key is generated by the registration authority (RA1), the public-key certificate corresponding to the generated public key is issued by the certificate authority (CA1), and the public key, the private key, and the public-key certificate are stored in the parent card. Furthermore, at least either the public-key certificate which stores the public-key of the certificate authority (CA1), or the public-key of the certificate authority (CA1) is stored in the parent card.

Figure 4:
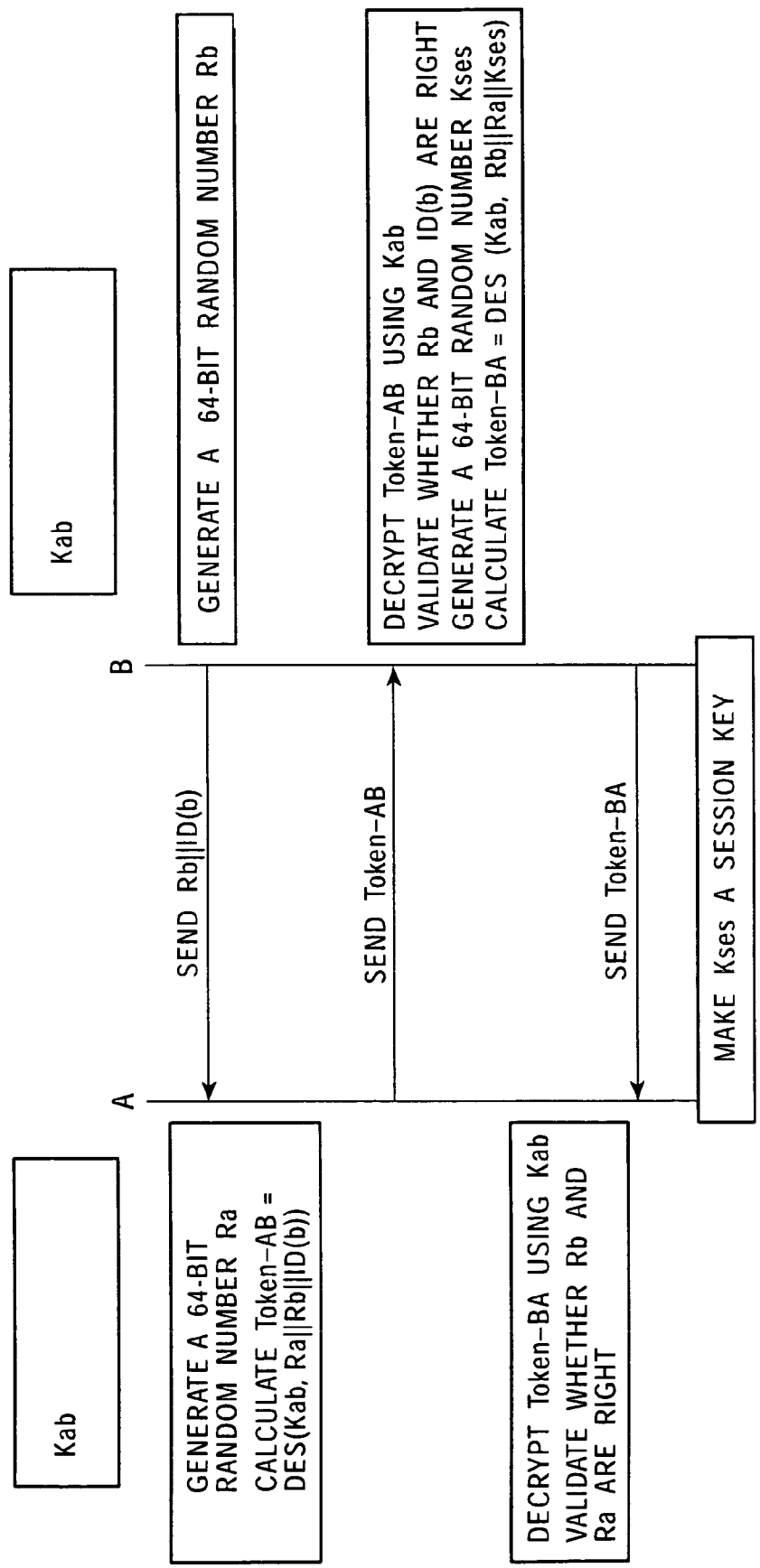
FIG. 4 is a diagram illustrating the sequence of the mutual authorization processing in the common-key system.

In this regard, prior to writing data of the public key, the private key, and the public-key certificate, mutual authentication is executed between an authentication server of the registration authority (RA1) and an IC card, thus writing the key data to an illegal card is prevented, and writing the key data is executed on the condition of the confirmation of a legitimate card. In this regard, the generation processing of the public key, the private key, and the public-key certificate corresponding to the parent card can be executed by the parent card itself. For the public-key certificate in this case, the public key generated by the parent card is sent to the certificate authority (CA1) through the registration authority (RA1), and a public-key certificate generated by the certificate authority is received. For the mutual authentication processing between the authentication server of the registration authority (RA1) and an IC card, for example, mutual authentication by a DES common-key encryption system is executed. In FIG. 4, the mutual authentication processing steps by the DES common-key encryption system is shown.

A description will be given of the mutual authentication processing steps by the DES common-key encryption system shown in FIG. 4. First, "B" generates a 64-bit random number Rb, and sends Rb and an ID(b) which is the ID of itself to "A". When "A" receives this, "A" newly generates a 64-bit random number Ra, data is encrypted in the sequence of Ra, Rb, and the ID(b) in the DES CBC mode using the key Kab, and returned to "B". Let the cryptogram Token–AB=E1+E2+E3.

When "B" receives this, "B" decrypts the receive data by the key Kab. A decryption method of the receive data is that, at first, the cryptogram E1 is decrypted by the key Kab to obtain the random number Ra. Next, the cryptogram E2 is decrypted by the key Kab, and an exclusive-OR operation is performed on this result and E1 to obtain the random number Rb. Finally, the cryptogram E3 is decrypted by the key Kab, and an exclusive-OR operation is performed on this result and E2 to obtain the ID(b). Of Ra, Rb, and the ID(b) obtained in this manner, Rb and the ID(b) are validated whether they are identical to the ones which "B" has sent. If the validation is approved, "B" authenticates that "A" is legitimate.

Next, "B" generates (a random number is used for generation) a session key (hereinafter referred to as Kses) to be used after authentication. Then encryption is performed in the sequence of Rb, Ra, and Kses in the DES CBC mode using the key Kab to be sent to "A".

When "A" receives this, "A" decrypts the receive data by the key Kab. A decryption method of the receive data is the same as the decryption method of "B", so that the details will be omitted here. Of Ra, Rb, and the ID(b) obtained in this manner, Rb and the Rb are validated whether they are identical to the ones which "A" has sent. If the validation is approved, "A" authenticates that "B" is legitimate. After the other parties are authenticated with each other, the session key Kses is used as a common key for secret communication after authentication.

In this regard, during validation of the receive data, if dishonesty or disagreement is found, the mutual authentication is considered to be failed, and the processing is aborted.

For example, when it is confirmed that the card is a legitimate card by the above-described mutual authentication processing, the storage processing of the public key, the private key, and the public-key certificate is performed for the card.

The format example of the public-key certificate is illustrated in FIG. 5. A public-key certificate is a certificate that when encrypted data is sent and received using a public key, or a public key is used in encrypted data communication between the two parties which performs sending and receiving data, or a public key is used in mutual authentication, a third party, that is, a certificate authority (CA) certifies that the public-key is a legitimate public-key. In some cases, the certificate authority (CA) is called as an organization having both of the functions as an issue authority (IA) which performs issue processing of a public-key certificate and a registration authority (RA) which performs issue review and management of a public-key certificate. However, the certificate authority is often recognized as an organization having only an issue authority (IA), that is, it is often recognized that an issue authority (IA)=a certificate authority (CA).

A description will be given of each data of the public-key certificate format shown in FIG. 5.

A version indicates a version of the public-key certificate format.

A certificate serial-number is a serial-number which is a serial-number of a public-key certificate set by a public-key certificate issue authority (CA).

A signature algorithm identifier and an algorithm parameter are a signature algorithm of a public-key certificate and a field for recording its parameter, respectively. In this regard, there are an elliptic curve cryptography (ECC) and an RSA for a signature algorithm. When the elliptic curve cryptography is applied, the parameter and the key length are recorded, and when the RSA is applied, the key length is recorded.

A name of issue authority (certificate authority) is a field in which a name of the issuer of the public-key certificate, that is, a public-key certificate issue authority (CA) is recorded in a distinct format (distinguished name).

A certificate validity records a start date & time and an end date & time of the validated date of the certificate.

A public-key certificate user identification (ID) records a name of the authentication object which is the subject person of the public-key certificate user. Specifically, it is an IC-card identification, a user-device ID, an ID of service providing entity, etc.

A user public-key (subject Public Key info: algorithm, subject Public key) is a field which stores a key algorithm as user public-key information and the key information itself.

The signature added by the certificate authority is a digital signature executed on public-key certificate data using a private key of the public-key certificate issue authority (CA). The user of the public-key certificate validates the signature using the public-key of the public-key certificate issue authority (CA), and thus is capable of checking if the public-key certificate has been altered or not.

Returning to FIG. 3, a description will be continued on the parent card issue processing. When the storage processing of the public key, the private key, and the public-key certificate is completed, in step S103, the parent-card management authority receives a parent card issue application with user information necessary for a parent card-issue processing from a user, and executes write processing of user information on the card. Basic personal information is written in the parent card. Furthermore, a service code corresponding to a child card permitted to the user and a child-card issue history, in which the upper limit number of child-card issues corresponding to each service code, are written into the parent card.

The parent-card management authority registers the ID stored in the public-key certificate stored in the parent card to be issued, the user information received from the user, and child-card issue history table information in a database server with having relationships with each other.

When writing programs, key data, user information, etc. is completed in steps S101 to S103, in step S104, a parent-card issue processing is executed, thus the parent-card issue processing is performed to the user who made an issue request of the parent card.

Figure 6:
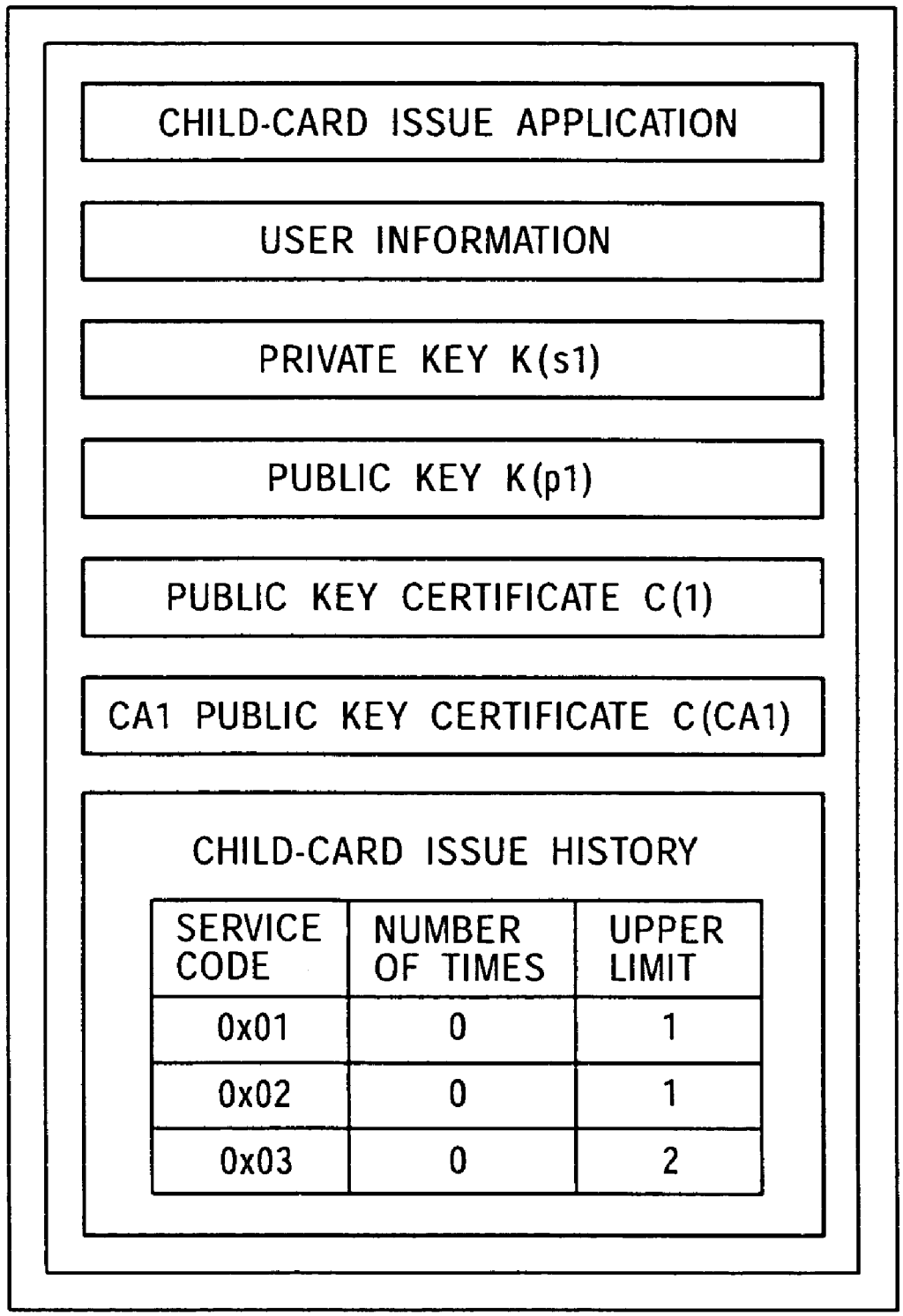
FIG. 6 is a diagram illustrating the configuration example of the parent-card of the present invention.

In FIG. 6, a storage data structure example of a parent card is illustrated. As shown in FIG. 6, a parent card stores a child-card issue application program, user information, a private key K(s1), a public key K(p1), a public-key certificate C(1), a certificate authority CA1 public-key certificate C(CA1), and a child-card issue history table.

The child-card issue application program is a program to be read into the CPU of the parent card and is executed when the user requests an issue of a child card to a child-card issue agency, for example, a service provider. At this time, an issue control of a child card is performed by the data on the child-card issue history table.

As shown in FIG. 6, the child-card issue history table is a table for child-card issue management, which stores service codes set for the service types provided by the child card, an upper limit number of issue times data of the child card corresponding to the service code, and a number of already issued times data of the child card. A new child card on the basis of the parent card is issued only if a number of times data<upper limit data. A detailed description will be given of the child-card issue processing later.

The parent card stores a private key K(s1), a public key K(p1), and a public-key certificate C(1), which are set corresponding to the parent card, and further stores a public-key certificate C(CA1) of the certificate authority CA1 which issued the public-key certificate C(1). These are applied to the mutual authentication processing in child-card issue processing, etc. which uses the parent card.

[Child Card Issue Processing]

Next, a description will be given of the child-card issue processing executed at a child-card issue agency which has a child-card issue machine such as a service provider shown in FIG. 1 using FIG. 7.

Figure 7:
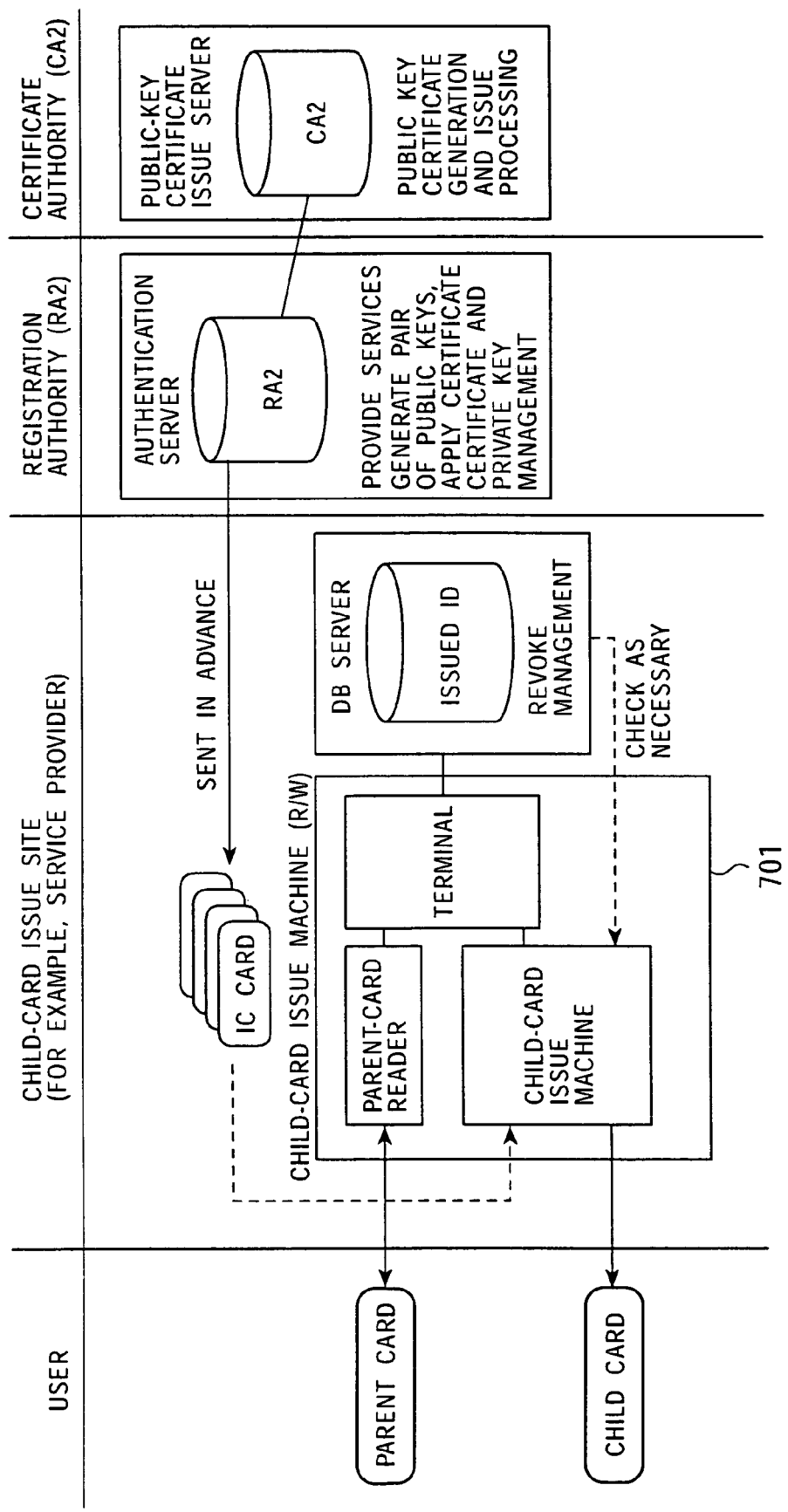
FIG. 7 is a diagram illustrating the child-card issue processing in the present invention.

In FIG. 7, from left, a user who receives a child card, a child-card issue site such as a service provider who executes the child-card issue processing, a registration authority (RA2) which reviews issue of the public-key certificate and executes generation processing of a pair of a public-key and a private key, and a certificate authority (CA2) which executes issue processing of the public-key certificate are shown.

The child-card issue processing is executed at the child-card issue agency having a child-card issue machine such as a service provider, etc. based on the parent card of the user. At the child-card issue site such as a service provider, etc., an IC card, which stores the private key, the public key, and the public-key certificate corresponding to each child card, is prepared in advance.

In this regard, a pair of the public key and the private key are generated by the registration authority (RA2), the public-key certificate corresponding to the generated public-key is issued by the certificate authority (CA2), and the public key, the private key, and the public-key certificate are stored in the child card. Further, at least either the public-key certificate authority C (CA2) which stores the public-key of the certificate authority (CA2), or the public-key of the certificate authority (CA2) is stored.

In this regard, prior to writing data of the public key, the private key, and the public-key certificate, mutual authentication is executed between an authentication server of the registration authority (RA2) and an IC card, thus writing the key data to an illegal card is prevented, and writing the key data is executed on the condition of the confirmation of a legitimate card. In this regard, the generation processing of the public key, the private key, and the public-key certificate corresponding to the child card can be executed by the child card itself. For the public-key certificate in this case, the public key generated by the child card is sent to the certificate authority (CA2) through the registration authority (RA2), and a public-key certificate generated by the certificate authority is received.

These IC cards for child cards are, for example, cards for executing services provided by service providers who manage the child-card issue sites, and for storing application programs for executing services. For example, if the card is used for electronic money, programs and data area which are available for electronic money are stored and obtained. Also, if the card is available for a commuter's ticket, programs and data area which are available for commuter's ticket are stored and obtained. In this regard, service codes are assigned corresponding to the types of cards, and the service codes are stored together at the time of storing application programs for executing services.

As described above, the service codes are also stored on the child-card issue history table of the parent card. In the child-card issue procedure, the child-card issue history table of the parent card possessed by the user is referenced, and only the child card which has a service code allowed for issue is issued.

A user who makes a child-card issue request corresponding to some service sets his or her parent card received from the parent-card management authority in a reader/writer (R/W) 701 of the child-card issue site.

The reader/writer (R/W) 701 reads the stored data from the set parent card. First, the parent card is validated if the card is registered as a revoked card, that is, an illegal card. The revocation validation steps are as follows: first, the public-key certificate C(1) (refer to FIG. 6) stored in the parent card is fetched and the signature validation processing of the public-key certificate C(1) is executed, and confirmation is performed that the public-key certificate C(1) has not been altered. After that, validation is performed whether the user identification (ID) of the public-key certificate stored in the public-key certificate C(1) is not registered as an revoked card identification (ID) in the database. If revoked, it is determined as an illegal card, and the child-card issue processing is not executed.

Figure 8:
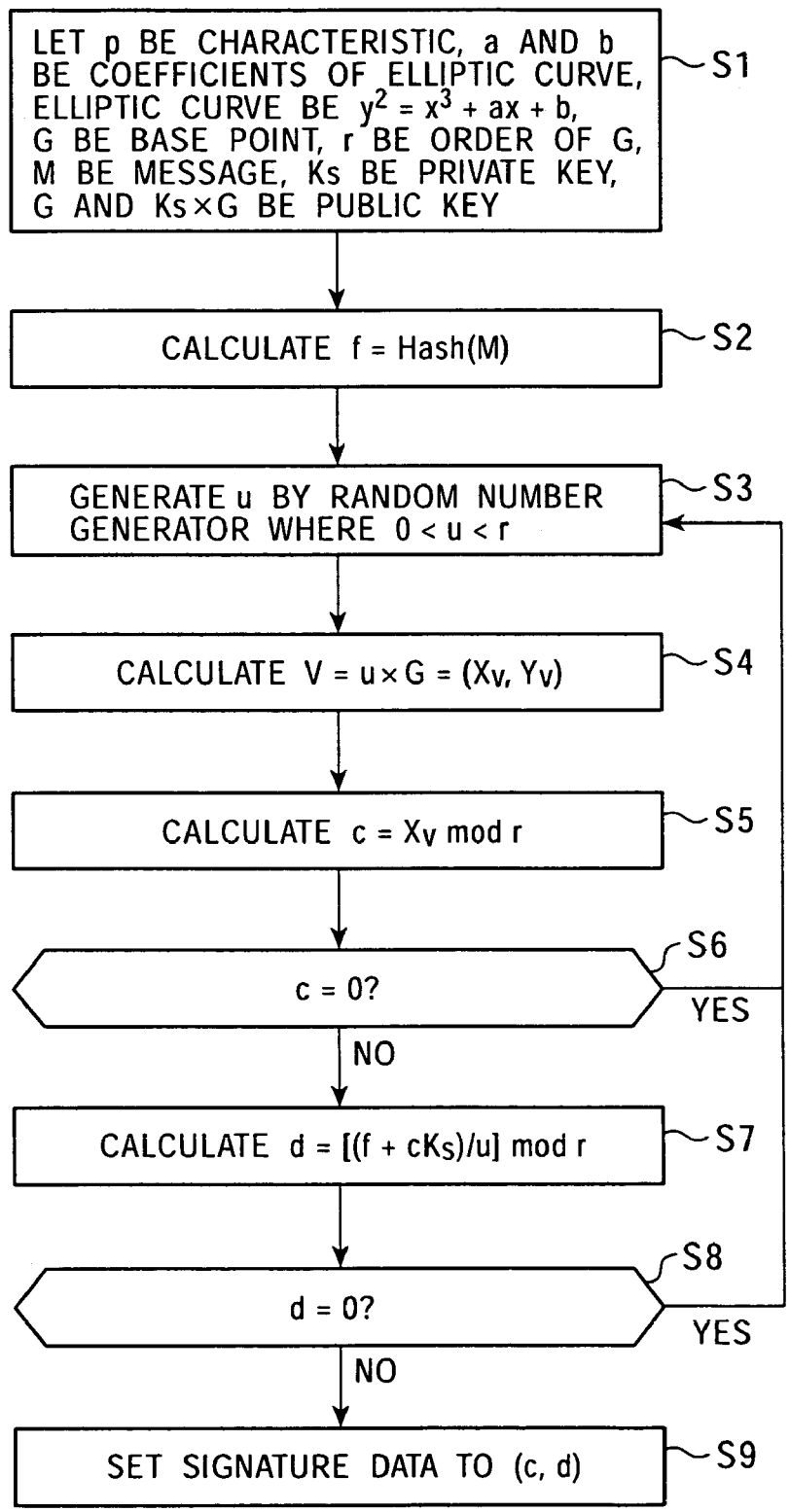
FIG. 8 is a diagram illustrating the signature-generation processing flow.
Figure 9:
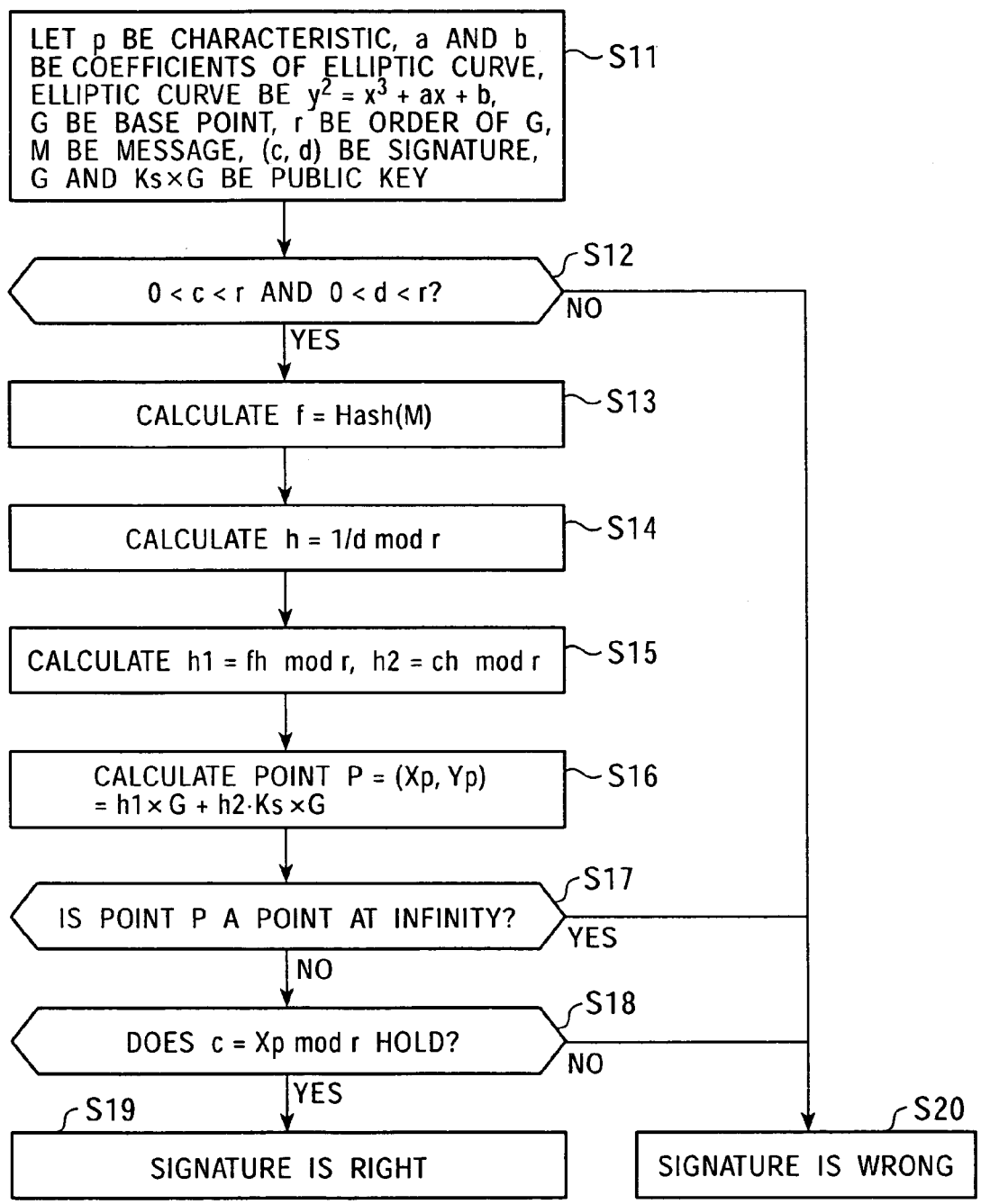
FIG. 9 is a diagram illustrating the signature-validation processing flow.

A description will be given of generation and validation processing of a digital signature using the public-key cryptography using FIGS. 8 and 9. The processing shown in FIG. 8 is a generation processing flow of the digital signature data using EC-DSA ((Elliptic Curve Digital Signature Algorithm), IEEE p1363/D3). In this regard, here, a description will be given of an example using an Elliptic Curve Cryptography (hereinafter referred to as ECC) as a public-key cryptography. In this regard, in the data processing unit in the present invention, it is possible to use similar public-key cryptography, for example, RSA cryptography ((Rivest, Shamir, Adleman), etc. (ANSI X9.31)) other than the elliptic curve cryptography.

Each step in FIG. 8 will be described. In step S1, let p be a characteristic, a and b be coefficients of elliptic curve (elliptic curve: $4a^3+27b^2 \neq \#0 \pmod p$), G be a base point on the elliptic curve, r be order of G, $K_s$ be a private key ($0<K_s<r$). In step S2, a hash value of a message M is calculated, and set as follows: f=Hash (M).

Here, a description is given of the method to calculate the hash value using a hash function. A hash function is a function which receives a message as an input, and compresses this to a predetermined bit-length data to output as a hash value. The hash function has a characteristic in which an input is difficult to be forecasted from a hash value (output), if one bit of input data of the hash function varies, many bits of the hash value changes, and it is difficult to find a different input data which have the same hash value. For a hash function, MD4, MD5, SHA-1, etc. are sometimes used, and DES-CBC is sometimes used. In this case, MAC (check value: corresponding to ICV), which is the final output value, is the hash value.

Following this, in step S3, a random number u ($0<u<r$) is generated, and in step S4, the coordinates (Xv, Yv), which are u times base point, is calculated. In this regard, addition and two-times multiplication are defined as follows:

Let P=(Xa, Ya), Q=(Xb, Yb), R=(Xc, Yc)=P+Q,
When P≠Q (addition), $Xc=\lambda^2-Xa-Xb$ $Yc=\lambda \times (Xa-Yc)-Ya$ $\lambda=(Yb-Ya)/(Xb-Xa)$.

When P=Q (two times), $Xc=\lambda^2-2Xa$ $Yc=\lambda \times (Xa-Yc)-Ya$ $\lambda=(3(Xa)^2+a)/(2Ya)$ Using these, u times point G is calculated (slow speed, but the easiest to understand. The way is as follows: Calculate G, 2×G, 4×G . . . . Convert u into a binary number system, and add the corresponding $2^i \times G$ (value calculated by doubling G for i times (i is the bit location calculated from LSB of u to the location where the bit is 1)).

In step S5, calculate c=Xv mod r, and in step S6, it is determined whether this value becomes 0. If not 0, in step S7, calculate d=[(f+cK$_s$)/u] mod r. In step S8, it is determined whether d is 0. If d is not 0, in step S9, c and d are output as digital signature data. Assuming r has a length of 160 bits, the digital signature data will have a length of 320 bits.

In step S6, if c is 0, the processing goes back to step S3, and a new random number is generated. Similarly, if d is 0 in step S8, the processing goes back to step S3, and a new random number is generated.

Next, a description will be given of a validation method of the digital signature using the public-key cryptography using FIG. 9. In step S11, let M be a message, p be a characteristic, a and b be coefficients of elliptic curve (elliptic curve: $y^2=x^3+ax+b$), G be a base point on the elliptic curve, r be order of G, and G and Ks×G be public keys (0<Ks<r) In step S12, validation is performed if the digital signature data c and d satisfy: 0<c<r, 0<d<r. If satisfied, in step S13, calculate the hash value of the message M, and set as follows: f=Hash (M). Next, in step S14, calculate h=1/d mod r, and in step S15, calculate h1=fh mod r, h2=ch mod r.

In step S16, using already calculated h1 and h2, calculate a point P=(Xp, Yp)=h1·G+h2·Ks×G. The digital signature reviewer knows the public keys G and Ks×G, and thus he or she can calculate multiplication of scalars of a point on the elliptic curve similarly as in step S4 in FIG. 8. Then in step S17, the point P is determined if it is a point at infinity. If not a point at infinity, the processing goes to step S18 (actually, determination of a point at infinity can be done in step S16. This means that P=(X,Y), and Q=(X, −Y) are added, λ cannot be calculated, and P+Q is determined to be a point at infinity). In step S18, calculate Xp mod r, and compare it with digital signature data c. When the values are identical at last, the processing goes to step S19, and the digital signature is determined to be right.

When the digital signature is determined to be right, it is understood that the data has not been altered, and that the digital signature has been generated by the person who holds a private key corresponding to the public key.

In step S12, if the digital signature data c and d do not satisfy: 0<c<r, 0<d<r, the processing goes to step S20. Also, in step S17, if the point P is a point at infinity, the processing goes to step S20. Furthermore, in step S18, if a value Xp mod r is not identical to the digital signature data c, the processing also goes to step S20.

In step S20, if the digital signature is determined to be wrong, it is understood that the data has been altered, or the digital signature has not been generated by the person who holds the private key corresponding to the public key.

The public-key certificate has a digital signature of the issue agency, and has a structure in which checking is possible on the alteration of the certificate by signature validation by a public-key user.

When the public-key certificate C(1) stored in the parent card is confirmed that it is a legitimate public-key certificate which has not been altered by the signature validation described above, the child-card issue machine (R/W) 701 shown in FIG. 7 confirms that the parent card has not been revoked based on the identification (ID) fetched from the public-key certificate C(1). The parent card is validated that the card is not a revoked card, that is, it is not registered as an illegal card by comparing a user identification (ID) of the public-key certificate C(1) with the revocation list (a list on which identifications (ID) of revoked cards are registered) in the database. If it is revoked, the card is identified as an illegal card, and the child-card issue processing is not executed.

When the parent card is confirmed that the card is not revoked, and that it is a legitimate card, the child card issue processing is executed. FIG. 10(a) illustrates the storage data configuration example of the child-card. A child card stores, in advance, a private key K(s2) corresponding to the child card, a public key K(p2), a public-key certificate C(2), and a public-key certificate C(CA2) of the certificate authority (CA2) which issued the public-key certificate C(2). Furthermore, the public-key certificate C(1) corresponding to the parent-card public-key stored in the parent card, and the public-key certificate C(CA1) of the certificate authority CA1 which issued the public-key certificate C1 of the parent card are read from the parent card, and stored.

Furthermore, an issue certificate, which certifies that it is a child card issued based on the parent card, is stored along with a digital signature by the parent card private key. As described using FIGS. 8 and 9, the digital signature is a signature to be executed to enable validation of whether the data has been altered.

FIG. 10(b) illustrates a structure example of the issue certificate. In the issue certificate, an ID of a child card is stored. This is an ID which is identical to the identification (ID) stored in the public-key certificate C(2) of the child card stored in the child card. Also, a service code corresponding to the child card is stored, and a digital signature is attached to these items based on the private key of the parent card.

In this regard, a child card is a card on which an application program corresponding to a provided service is stored, and, is made for, for example, a card available for electronic money, a card available for commuter's ticket, and a card available for identification in a company or an organization.

FIG. 10(c) illustrates an application configuration example of the child-card available for a commuter's ticket. When using the card as a commuter's ticket, for example, a program which is executed for read/write processing, etc. by a reader/writer (R/W) equipped at a station ticket gate is a commuter's ticket application program (service code: 0x10) of the lower part of FIG. 10(c). The commuter's ticket application program executes, for example, read/write processing of data, for example, a use section, a use time period, etc. from/into the data area of the child card.

A commuter's ticket issue application (service code: 0x02) of the upper part of FIG. 10(c) is an upper program of the commuter's ticket application program (service code: 0x10) of the lower part, and controls whether or not to enable validly the execution of the commuter's ticket application program of the lower part. Specifically, the upper program gives the execution permission of the processing to which the commuter's ticket application program of the lower part is applied. The processing using these application will be described in detail later.

When the child card has a program having a hierarchical structure as shown in FIG. 10, the service code registered in the parent card becomes the service code (service code: 0x02) corresponding to the upper program. However, it may have a structure in which the service code (service code: 0x10) is registered in the parent card as necessary.

The child card issue processing is executed based on the child-card issue history table stored in the parent card. When the child card has hierarchical structure programs, that is, the card has a structure in which the upper program controls the execution of the lower program, the use of the child card can be controlled by registering and managing the uppermost program on the child card in the child-card issue history table.

However, when there are a plurality of lower programs controlled by the upper program, and each program needs individual use limitation, the service code corresponding to each lower program may be stored in the child-card issue history table of the parent card, and issue management may be controlled for each service.

For example, when use management for each user is performed by setting the upper application program as a railway ticket issue application and setting a plurality of lower application programs, for example, a commuter's ticket application, a coupon ticket application, and a prepaid application, the child card issue management is performed by storing the service code of each lower application on the child-card issue history table. In this regard, the child-card issue management is a concept which includes the processing for enabling applications corresponding to services stored in the card to be executed in addition to the physical issue of the card itself, specifically including storage processing of the issue certificate. Use of the service becomes possible based on the issued certificate. The service use processing based on the issued certificate will be described later.

In this regard, in the program structure shown in FIG. 10(c), the upper program performs, for example, receipt processing of the issue certificate of the child card by executing authentication of the public-key cryptography, and the lower program executes authentication of the common-key system in which faster and easier processing is possible. For example, when using a commuter's ticket, authentication processing is performed by the common-key system with the reader/writer (R/W) installed at a station, etc. However, which system is to be used for the authentication processing should be set in consideration of the security level of the requested processing, speed, etc. The card may have a structure in which both the upper program and the lower program execute authentication by the public-key system, or both the upper program and the lower program execute authentication by the common-key system.

Figure 11:
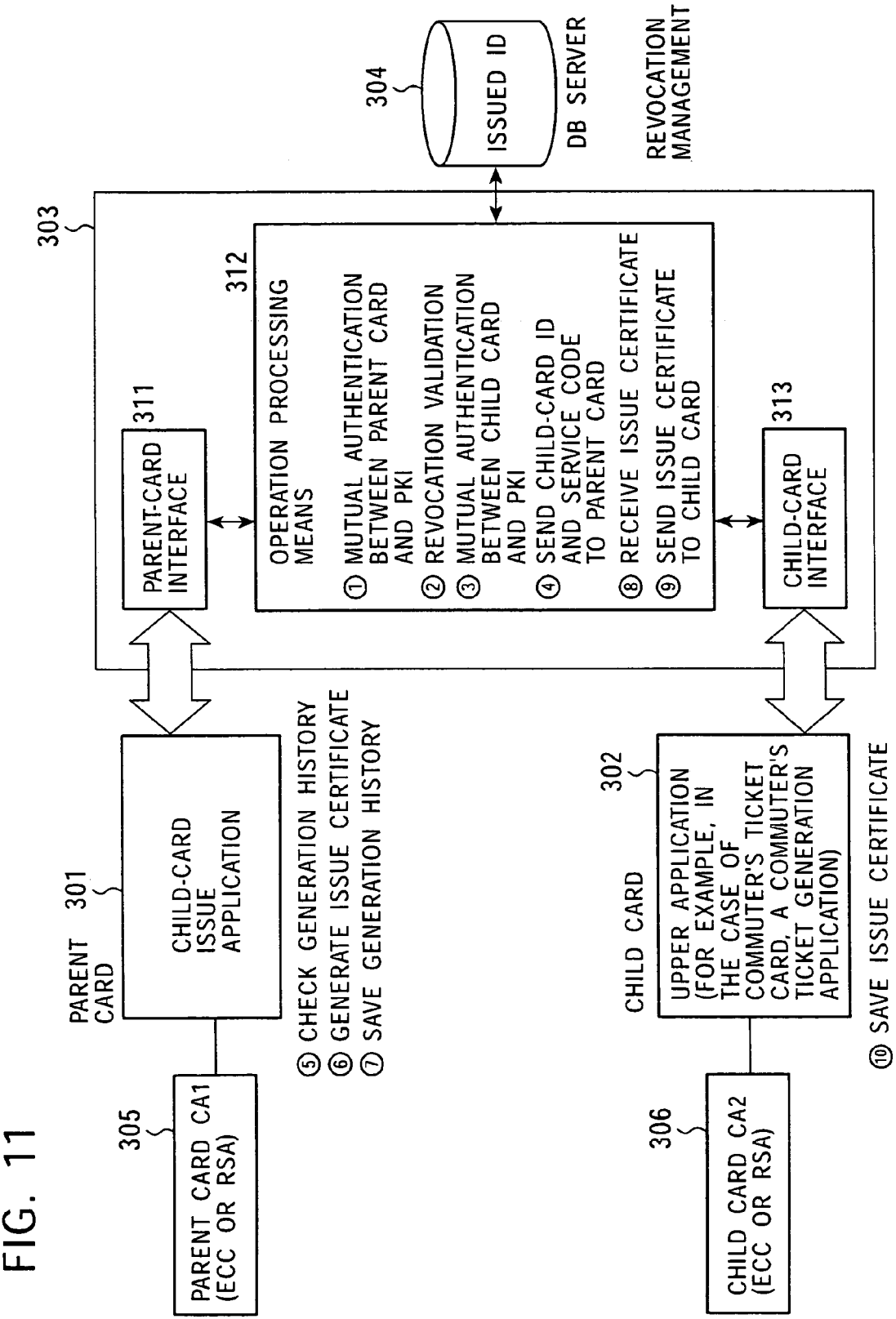
FIG. 11 is a diagram illustrating the child-card issue processing in the present invention.

About the issue processing of the issue certificate stored in the child card, a description will be given using FIGS. 11 and 12. The issue certificate is a certificate which connects the parent card and the child card, issued for the child card by the parent card, and stored in the child card. The issue processing of the issue certificate in FIG. 11 is, for example, executed through the reader/writer 303 of the child card issue site managed by a service provider.

Suppose the parent card 301 stores the public-key certificate (ECC or RSA method) issued by the parent card certificate authority 305, and the child card 302 stores the public-key certificate (ECC or RSA method) issued by the child card certificate authority 306. In this regard, each of the public-key certificates may be different system, or may be the same system. For the issue processing of the issue certificate stored in the child card, the child-card issue application program of the parent card 301 is executed. An application corresponding to a child card 302, in many cases, an upper application, for example, in the case of a card using for a commuter's ticket, the commuter's ticket issue application program shown in FIG. 10(c) is executed.

A parent-card interface 311 and child-card interface 312 of the reader/writer 303 operates for just a signal converter, and an operation processing means 312 executes mutual authentication processing, data processing, and data send/receive processing. The operation processing means 312 is equipped with a CPU, a RAM, a ROM, communication means, and encryption processing means in order to execute these processing. A database server 304 contains issued ID data, and further possesses a revocation list storing illegal identifications (ID).

A description will be given in sequence of the issue processing of the issue certificate stored in the child card in accordance with each step of the processing flow in FIG. 12. First, in step S201, mutual authentication processing is executed between the parent card 301 and the reader/writer 303. The parent card 301 stores a pair of a public-key and a private key, and the public-key certificate issued from the parent-card CA1, 305, and mutual authentication is executed by the public-key system.

Figure 13:
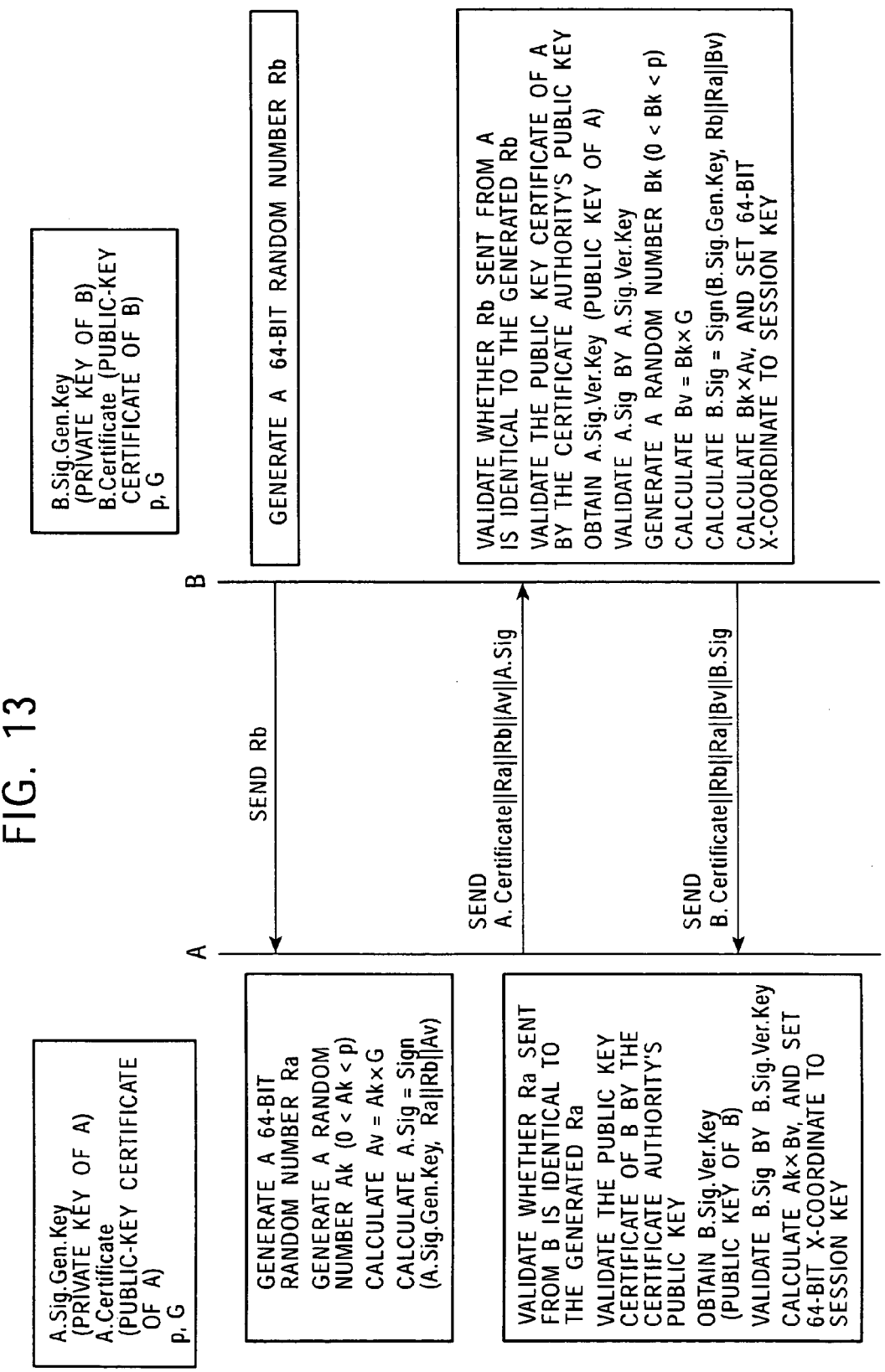
FIG. 13 is a diagram illustrating the sequence of the mutual authentication processing in the public-key system.

A description will be given of the mutual authentication method using a 160-bit long elliptic curve cryptography (ECC), which is a public-key cryptography using FIG. 13. In FIG. 13, an ECC method is used for the public-key cryptography, but an RSA may be used instead. Also, the key size may not be 160 bits. In FIG. 13, first "B" generates a 64-bit random number Rb, and sends it to "A". When receiving this, "A" generates a new 64-bit random number Ra and a random number Ak, which is smaller than a characteristic p. Then a point Av=Ak×G, which is Ak times a base point G is calculated, a digital signature A.Sig for Ra, Rb, Av (X coordinate and Y coordinate) is generated, and is returned to "B" along with the public-key certificate of "A". Here, since Ra and Rb are 64 bits individually, each of the X coordinate and Y coordinate of Av is 160 bits, the digital signature for the total 448 bits are generated.

When using a public-key certificate, the user validates a digital signature of the public-key certificate using the public key of the public-key certificate issue authority (CA) held by himself/herself, fetches the public key from the public-key certificate after successful validation of the digital signature, and the public key is used. Accordingly, all the users using the public-key certificate needs to have the public key of the common public-key certificate issue authority (CA). In this regard, the validation method of the digital signature has been described in FIG. 9, and thus the details will be omitted.

When "B" receives the public-key certificate Ra, Rb, Av, and the digital signature A.Sig, "B" validates whether Rb sent from "A" is identical to the one generated by "B". As a result, if it is identical, the digital signature of the public-key certificate of "A" is validated by the public key of the certificate authority, and the public key of "A" is fetched. Then the digital signature A.Sig is validated using the fetched public key of "A". After the digital signature is successfully validated, "B" recognizes "A" as legitimate.

Next, "B" generate a random number Bk, which is smaller than a characteristic p. Then a point Bv=Bk×G, which is Bk times a base point G is calculated, a digital signature B.Sig for Ra, Rb, Bv (X coordinate and Y coordinate) is generated, and is returned to "A" along with the public-key certificate of B.

When "A" receives the public-key certificate Rb, Ra, Bv, and the digital signature B.Sig, "A" validates whether Ra sent from "B" is identical to the one generated by "A". As a result, if it is identical, the digital signature in the public-key certificate of "B" is validated by the public key of the certificate authority, and the public key of "B" is fetched. Then the digital signature B.Sig is validated using the fetched public key of "B". After the digital signature is successfully validated, "A" recognizes "B" as legitimate.

When both of them has succeeded in authentication, "B" calculates Bk×Av (Bk is a random number, but Av is a point on the elliptic curve, thus multiplication by scalar of a point on the elliptic curve is necessary), "A" calculates Ak×Bv, and the lower 64 bits of the X coordinates of these points is set as a session key to be used for the subsequent communication (in the case where the common-key cryptography with 64-bit key length is used for the common-key cryptography). Of course, the session key may be generated form a Y coordinate, and key may not be the lower 64 bits. In this regard, in the secret communication after mutual authentication, the send data is not only encrypted, but the digital signature may be added.

When validating a digital signature or received data, if dishonesty or discrepancy is found, mutual authentication is failed and the processing is aborted.

In such mutual authentication processing, send data is encrypted using the generated session key to execute mutual data communication.

When mutual authentication in step S201 has not succeeded, the processing is terminated as an error (S210). In this regard, in parallel with mutual authentication, revocation check is performed based on the parent card identification (ID) of the public-key certificate obtained from the parent card, referencing the revocation list stored in the database 304.

When the parent card is confirmed that it has not been revoked, and mutual authentication is successfully completed, in step S202, mutual authentication processing is executed between the child card 302 and reader/writer 303. The child card 302 stores a pair of a public-key and a private key, and the public-key certificate issued from the child card CA2, and mutual authentication is executed by the public-key system.

When mutual authentication in step S202 has not succeeded, the processing is terminated as an error (S210). When mutual authentication has succeeded, in step S203, the reader/writer 303 obtains the service code from the child card 302. In the child card 302 shown in FIG. 11, the service code corresponding to the upper application is obtained from the child card 302. In this regard, the service code is also stored in the child card at the time when downloading an application program for the child card.

Next, in step S204, the reader/writer 303 sends the service code of the child card 202 along with the identification (ID) of the child card to the parent card 301. Next, the child-card issue application of the parent card determines whether or not the issue times corresponding to the service code has reached the upper limit value based on the child-card issue history table (refer to FIG. 6). For example, when the upper limit value=2, which is set for the service code, if the issue times=2, the child card issue processing for the same service code is not carried out, and the processing is terminated as an error (S210).

When the issue times for the received service code has not reached to the upper limit value, that is, when issue times<upper limit value, the issue certificate is generated in step S206. As described using FIG. 10(*b*), the issue certificate includes a child-card ID and a service code, and a digital signature by the parent-card private key is added to the data.

Next, in step S207, the parent card 301 sends the parent card's public-key certificate C (FIG. 6: public-key certificate C(1)), the public-key certificate of the certificate authority (FIG. 6: the public-key certificate C(CA1) of CA1), and generated issue certificate which are stored in the parent card 301, to the reader/writer 303. Next, in step S208, the reader/writer 303 sends the parent-card public-key certificate received from the parent card 301, the public-key certificate of the certificate authority, and the issue certificate to the child card 302.

When the child card 302 receives the parent-card public-key certificate, the public-key certificate of the certificate authority, and the issue certificate from the reader/writer 303, in step S209, the received parent-card public-key certificate, the public-key certificate of the certificate authority, and the issue certificate are stored in the child card. In this storage processing, each data shown by dotted lines in FIG. 10(a) is stored in the child card as the receive data from the parent card.

Figure 12:
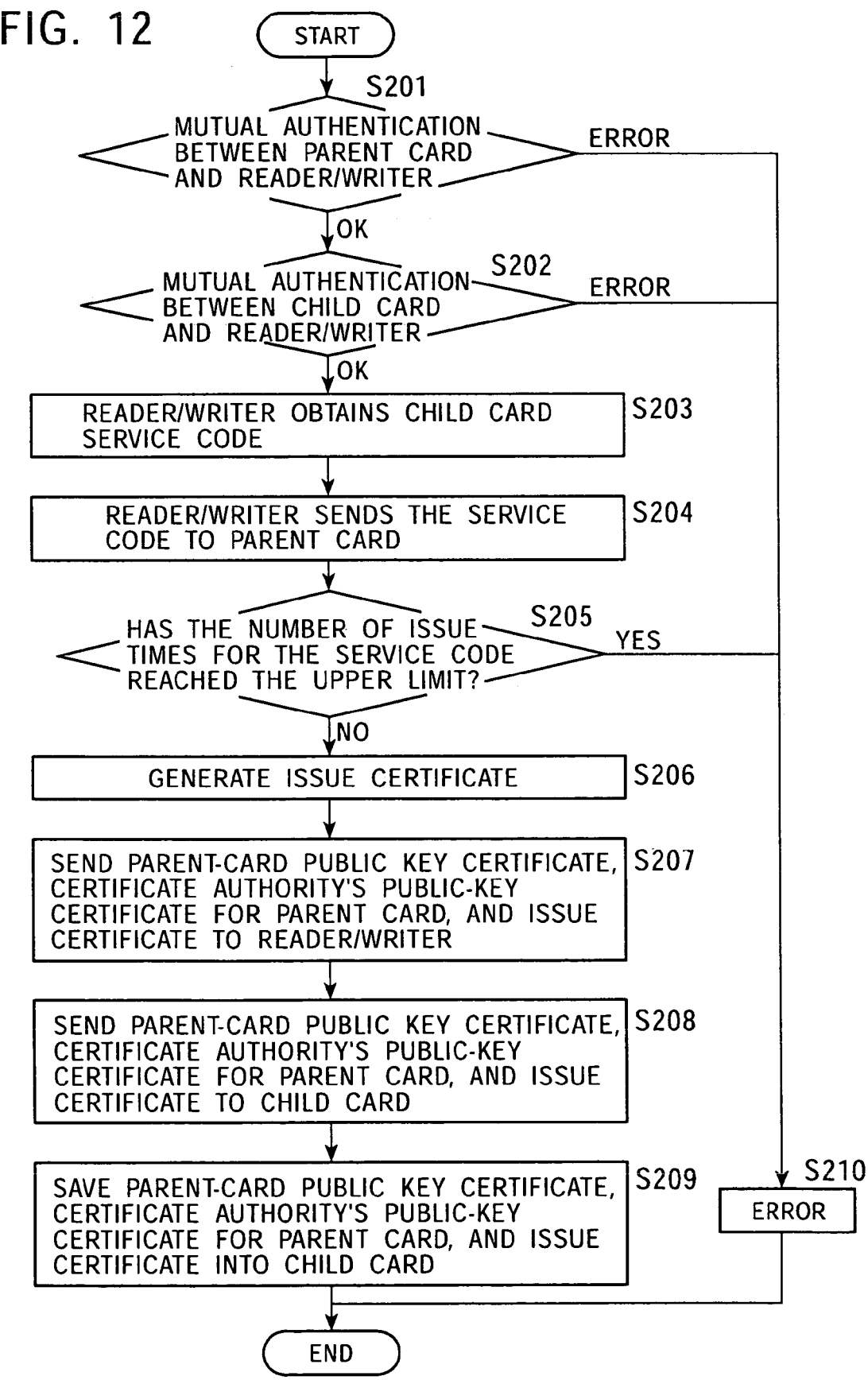
FIG. 12 is a diagram illustrating the storage processing of the issue certificate for the child card in the present invention.

The flow in FIG. 12 has been described as storage processing of the issue certificate into the child card with a reader/writer existing between the parent card and child card. However, if both of the parent card and child card can execute authentication processing program in the same method, for example, in accordance with the same public-key cryptography, ECC or RSA method, it is possible to directly communicate to execute the processing.

Figure 14:
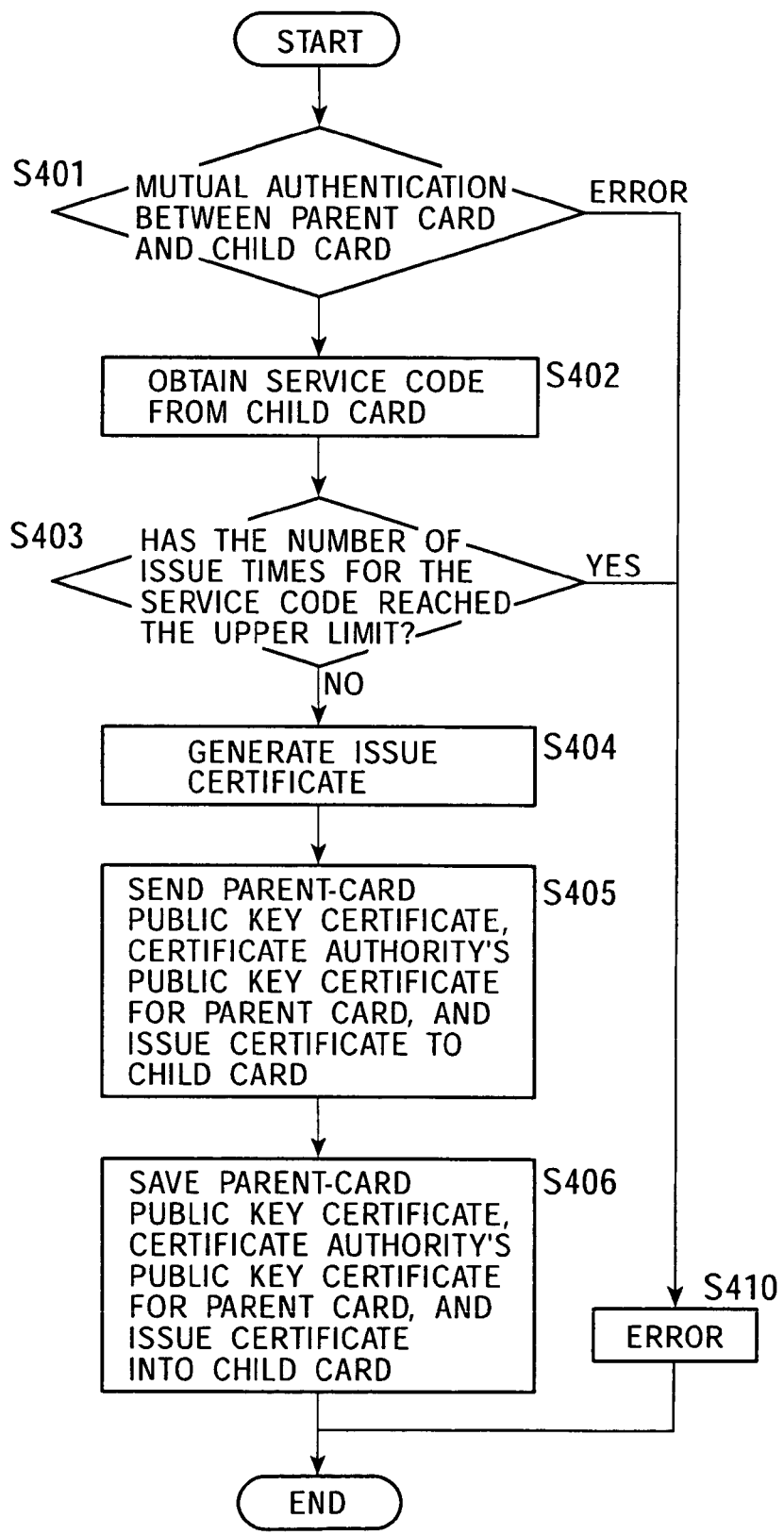
FIG. 14 is a diagram illustrating the storage processing of the issue certificate for the child card in the present invention.

The processing flow in which the parent card and child card directly communicate to execute processing is shown in FIG. 14.

Each step shown in FIG. 14 will be described. In step S401, mutual authentication processing is executed between the parent card 301 and the child card 302. The parent card 301 stores a pair of the public key and the private key, and the public-key certificate issued by the parent card CA1, 305, the child card 302 stores a pair of the public key and the private key, the public-key certificate issued by the child card certificate CA2, 306, and mutual authentication is executed in the public-key system. In this mutual authentication, send data is encrypted using the generated session key, and data communication is executed mutually.

When mutual authentication in step S401 has not succeeded, the processing is terminated as an error (S410). When mutual authentication is successfully completed, in step S402, the parent card 301 obtains the service code from the child card 302.

Next, in step S403, the child-card issue application of the parent card determines whether or not the issue times corresponding to the service code has reached the upper limit value based on the child-card issue history table (refer to FIG. 6). For example, when the upper limit value=2, which is set for the service code, if the issue times=2, the child card issue processing for the same service code is not carried out, and the processing is terminated as an error (S410).

When the issue times for the received service code has not reached to the upper limit value, that is, when issue times<upper limit value, the issue certificate is generated in step S404. As described using FIG. 10(b), the issue certificate includes a child-card ID and a service code, and a digital signature by the parent-card private key is added to the data.

Next, in step S405, the parent card 301 sends the parent card's public-key certificate C (FIG. 6: public-key certificate C(1)), the public-key certificate of the certificate authority (FIG. 6: the public-key certificate C(CA1) of CA1), and generated issue certificate which are stored in the parent card 301, to the child card 302. The child card 302, which has received the parent-card public-key certificate from the parent card 301, the public-key certificate of the certificate authority, and the issue certificate, in step S406, sends the received parent-card public-key certificate, the public-key certificate of the certificate authority, and the issue certificate to the child card. In this storage processing, each data shown by dotted lines in FIG. 10(a) is stored in the child card as the receive data from the parent card.

Figure 15:
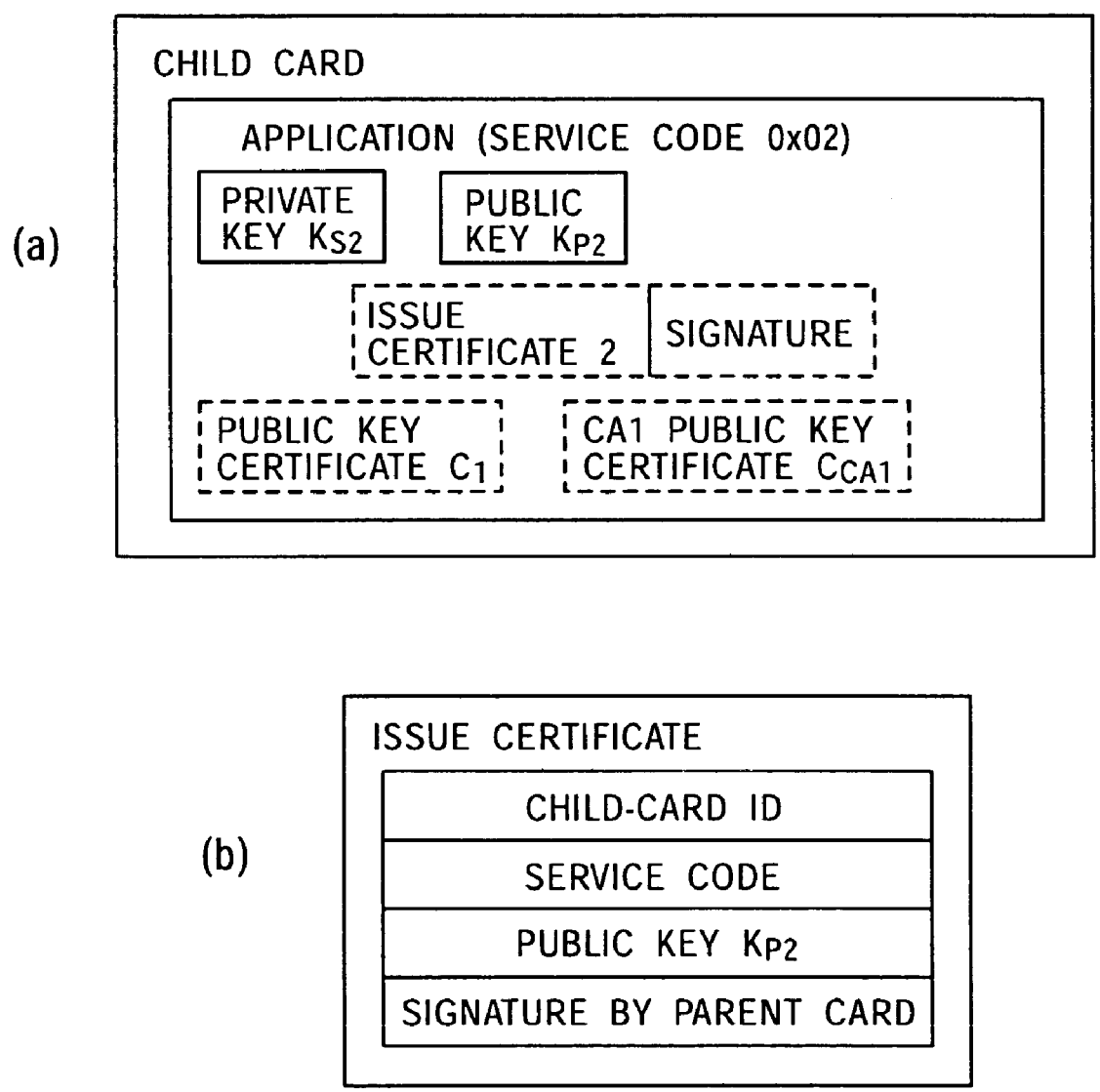
FIG. 15 is a diagram illustrating the configuration example of the child-card in the present invention.

In this regard, the data structure to be stored in the child card is not limited to the structure in FIG. 10(a), and for example, may be the structure shown in FIG. 15(a). In FIG. 15(a), the child card has a private key K(s2) corresponding to the child card, a public key K(p2), and furthermore, has, as written information from the parent card, the issue certificate 2 having a digital signature by the private key of the parent card, the parent-card public-key certificate C(1), and a public-key certificate C (CA1) of the certificate authority (CA1) which issued the public-key certificate of the parent card. The difference from FIG. 10(a) is that the card does not have the public-key certificate of the child card, and the public-key certificate C (CA2) of the certificate authority (CA2) which has issued the child card public-key certificate.

The issue certificate 2 in the structure of FIG. 15(a) has a structure in FIG. 15(b), which is different from the structure in FIG. 10(b). Specifically, the child-card identification (ID), the service code set for the service executed using the child card, and the public key (p2) of the child card itself are stored, and the digital signature by the private key of the parent card for these data is added.

Specifically, the difference from the structure in FIG. 10(a) is that the issue certificate 2 stores the public key K(p2) of the child card itself, and has a digital signature by the private key of the parent card. This issue certificate 2 does not have a signature of the certificate authority so that it is not valid as a public-key certificate in general. However, the certificate plays the similar role as the public-key certificate in a limited level to the use of the child card under the control of service entity to which the child card is applied.

[Child Card Use Example]

As described above, the child card issued based on the parent card issued by the parent card management authority is used when receiving the service corresponding to the service code set in the child card. For example, when using the child card available for a commuter's ticket, the user first performs setting processing of a commuter's ticket use section and a time period as commuter's ticket purchase processing. After the setting is completed, the child card set as a commuter's ticket is used by performing necessary processing such as data read or write processing using the reader/writer (R/W) installed at the station ticket gate.

The use form is different depending on the service set in the child card, and is corresponding to the setting of the service provider in charge of the service. Basically, it is preferable that the important processing which requires high security is executed by the public-key authentication processing (refer to FIG. 13), and the daily processing which is not so important and requires speed rather than high security is executed by the authentication processing using the common-key authentication (refer to FIG. 14).

As described using FIG. 10(c), in the child card, lower application programs, which are controlled by the upper application program, can be set, and one or more lower applications can be set to execute the service based on the lower applications. For a specific example, it is possible to set various railway ticket issue applications for, such as a commuter's ticket, a prepaid, and a coupon ticket, as an upper application, and a ticket use program, a prepaid use program, and a coupon use program as lower applications.

First, the user sets the child card in a reader/writer (R/W) as a ticket vending machine in a mutually capable state for communication, and executes purchase processing of various railway tickets such as a commuter's ticket, a prepaid ticket, a coupon ticket, etc. In the upper application processing, by mutual authentication by the public-key certificate processing (refer to FIG. 13), validation confirmation of the mutual devices, that is, a reader/writer (R/W) as a railway ticket vending machine and a child card, is performed, and the service execution processing, in this case, purchase processing of each railway ticket, is executed.

When purchasing each railway ticket is completed, the user performs use processing of various railway tickets such as a commuter's ticket, a prepaid ticket, a coupon ticket, etc. by executing read processing of the child card by the reader/writer (R/W) as an automatic ticket gate installed at station ticket gates using the child card. In this regard, data writing into the child card may be carried out if necessary. For execution processing of the lower application, which is performed as child-card use processing, speedy processing is required, and thus it is preferable to execute the common-key certificate having a little processing load.

Figure 16:
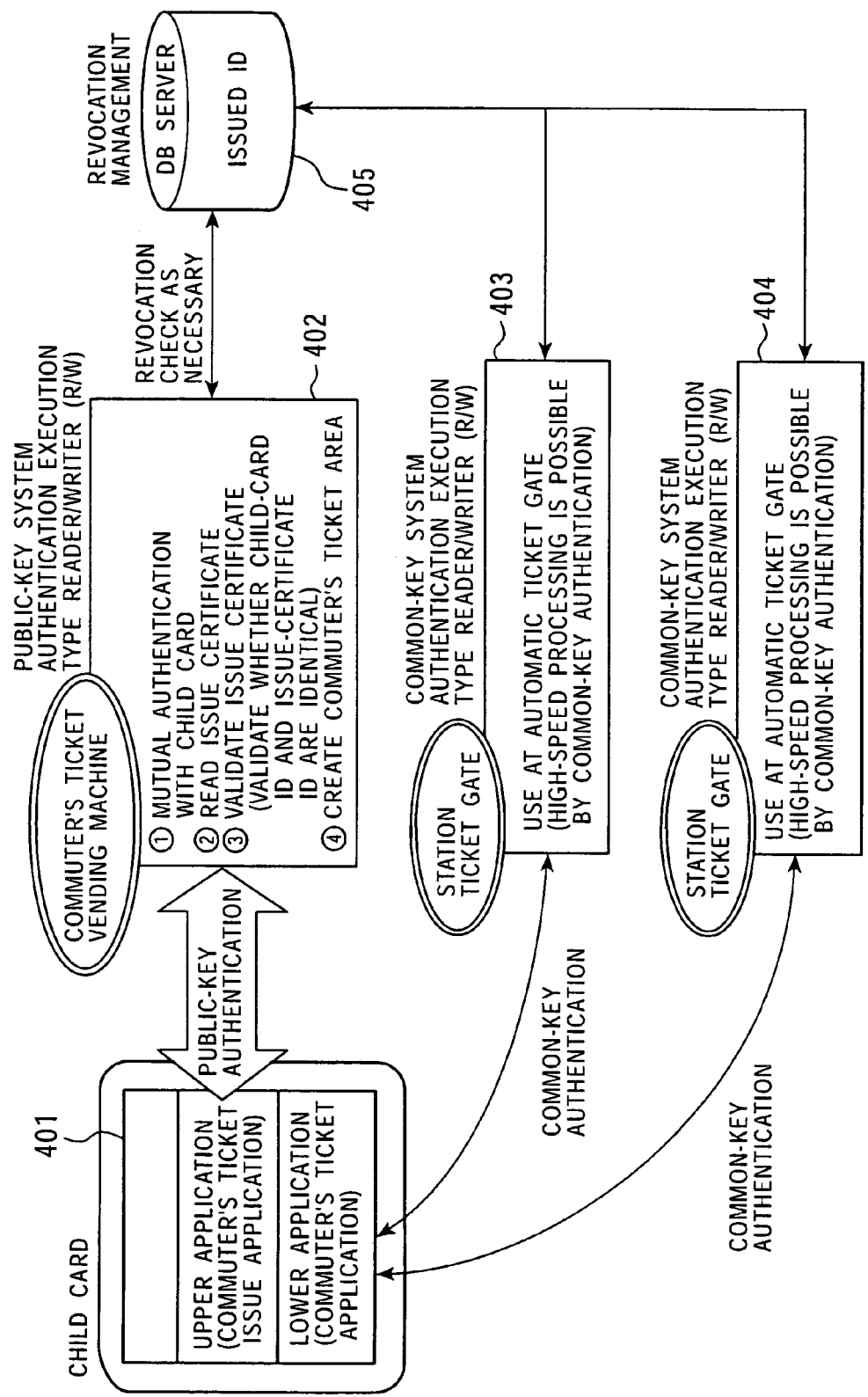
FIG. 16 is a diagram illustrating the use example of the child-card in the present invention.

A description of the structure in which a child card is used as a commuter's ticket is FIG. 16. The child card 401 stores a commuter's ticket issue application as an upper application, and stores a commuter's ticket use application as a lower application.

Figure 17:
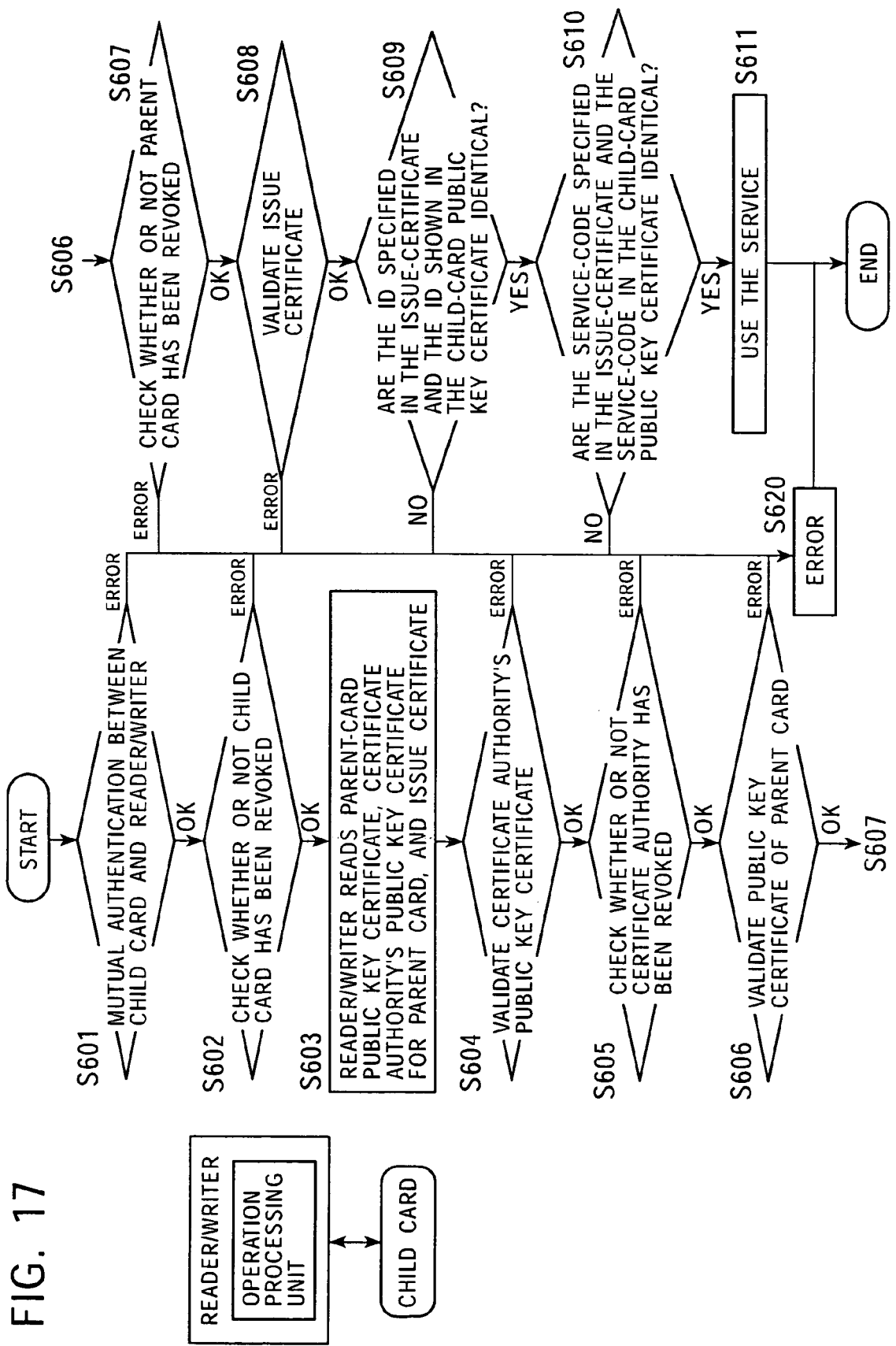
FIG. 17 is a flowchart illustrating the use example of the child-card in the present invention.

First, the user sets the child card in the commuter's ticket vending machine 402 in a state capable of communication, and purchases a commuter's ticket. FIG. 17 shows a flowchart illustrating the steps executed for commuter's ticket purchase processing.

Each step in FIG. 17 will be described. First, in step S601, mutual authentication processing is executed between the commuter's ticket vending machine 402 as a reader/writer (R/W) and a child card 401. This mutual authentication processing is executed based on the public-key system. In this regard, if the commuter's ticket vending machine itself is confirmed that it is a reliable machine, for example, the machine is installed in the management space at a predetermined station, it is not indispensable for the child card to execute authentication for the reader/writer (R/W), and one-way authentication processing, in which the reader/writer (R/W) only performs authentication for the child card, may be executed. When the authentication has not succeeded, it is determined as an error (S620), the subsequent processing is not executed, and the processing is terminated.

Also, in the authentication processing, the reader/writer fetches the public-key certificate from the child card, executes signature validation processing of the fetched public-key certificate in order to confirm validity of the public-key certificate of the child card. If it is determined by the signature validation that the certificate has been altered, authentication has failed, thus it is determined as an error, and the processing is terminated.

When the authentication has succeeded, in step S602, the reader/writer (R/W) validates whether the child card has been revoked. The revocation check is executed by processing of checking whether or not the ID received from the child card is not included on the revocation list in the database connected to the reader/writer (R/W), that is, the illegal card identification (ID) list. If the ID received from the child card is included on the revocation list, the card is determined as an illegal card, the processing is determined as an error, and the subsequent processing is not executed and the processing is terminated.

When the child card has not been revoked, the processing goes to next step. In step S603, the reader/writer (R/W) reads "parent-card public key certificate", "public-key certificate of the certificate authority which issued the parent card public-key certificate", and "issue certificate" stored in the child card.

Next, in step S604, the reader/writer (R/W) validates the "public-key certificate of the certificate authority which issued the parent card public-key certificate" which has been read from the child card. As described above, a public-key certificate has a signature (For example, a signature followed the processing in FIG. 8.) by the private key of the certificate authority which has issued the public-key certificate, and signature validation is executed using the public key corresponding to the private key. The "public-key certificate of the certificate authority which issued the parent card public-key certificate" has a signature of the upper certificate authority of the certificate authority which has issued the parent card public-key certificate, and the reader/writer (R/W) executes signature validation processing (for example, the signature validation followed the processing in FIG. 9) using the public key of the upper certificate authority. If the signature is determined to have been altered in the signature validation, it is determined as an error, the subsequent processing is not executed, and the processing is terminated.

If determination is made that the data has not been altered, that is, it is the legitimate "public-key certificate of the certificate authority which issued the parent card public-key certificate", in step S605, validation is performed of that the identification (ID) of the certificate authority taken from the "public-key certificate of the certificate authority which issued the parent card public-key certificate" is not registered on the revocation list. If the certificate authority ID is included in the revocation list, the public-key certificate is determined to have been revoked and not valid, thus it is determined as an error, the subsequent processing is not executed, and the processing is terminated.

If the certificate authority has not been revoked, the processing goes to next step. In step S606, the reader/writer (R/W) validates "parent-card public-key certificate" which has been read from the child card. The "parent card public-key certificate" has a signature (For example, a signature followed the processing in FIG. 8) by the private key of the certificate which has issued the public-key certificate, that is, the "certificate issued the parent card public-key certificate", and executes the signature validation (for example, the signature validation followed the processing in FIG. 9) using the public key corresponding to the private key. If the signature is determined to have been altered in the signature validation, it is determined as an error, the subsequent processing is not executed, and the processing is terminated.

If determination is made that the data has not been altered, that is, it is the legitimate "public-key certificate of the certificate authority which issued the parent card public-key certificate", in step S607, validation is performed of that the identification (ID) of the certificate authority taken from the "parent card public-key certificate" is not registered on the revocation list. If the parent-card ID is included in the revocation list, the public-key certificate is determined to have been revoked and not valid, thus it is determined as an error, the subsequent processing is not executed, and the processing is terminated.

Next, in step S608, the reader/writer (R/w) validates "issue certificate" which has been read from the child card. The "issue certificate" has a signature (For example, a signature followed the processing in FIG. 8) by the private key of the parent card which has issued the issue certificate", and executes the signature validation (for example, the signature validation followed the processing in FIG. 9) using the public key of the parent card corresponding to the private key. In this regard, for the public key of the parent card, the public key taken from "parent card public-key certificate" can be used. If the signature is determined to have been altered in the signature validation, it is determined as an error, the subsequent processing is not executed, and the processing is terminated.

Next, in step S609, the reader/writer (R/W) validates whether the child card identification (ID) stored in the "issue certificate" read from the child card and the identification (ID) stored in the public-key certificate of the child card are identical. In this regard, the validation processing of the public-key certificate of the child card has been executed in mutual authentication in step S601. Accordingly, the ID is obtained from the public-key certificate of the validated child card.

When the child card identification (ID) stored in the "issue certificate" and the identification (ID) stored in the public-key certificate of the child card are not identical, there is not consistency between the "issue certificate" and "public-key certificate of the child card", thus it is determined as an error, the subsequent processing is not executed, and the processing is terminated.

Next, in step S610, the reader/writer (R/W) determines whether or not the service code stored in the "issue certificate" which has been read from the child card and the service code of the child card are identical. The service code of the child card is data to be written as service identification data corresponding to application when downloading the child-card issue application program which is executed before the child-card issue processing, that is, before storing the issue certificate.

When the service code stored in the "issue certificate" and the service code of the child card are not identical, there is not consistency between the "issue certificate" and the "child card", thus it is determined as an error, the subsequent processing is not executed, and the processing is terminated.

When the service code stored in the "issue certificate" and the service code of the child card are identical, in step S611, the service is executed. For example, issue processing of a commuter's ticket.

The processing described using the processing flow in FIG. 17, is the processing between the child card 401 and a commuter's ticket vending machine 402 in FIG. 16, and revocation state of the "child card", the "certificate authority which issued the parent card public-key certificate", and "parent card" is validated.

In this way, the upper application processing of the child card 401 is executed by the rigid review on the basis of authentication by the public-key system as it is an important processing such as a commuter's ticket issue. On the other hand, for actual use of a commuter's ticket, that is, for the processing of passing a station ticket gate, speedy processing has priority, and thus common-key authentication is carried out.

In this regard, of the processing described using the processing flow in FIG. 17, revocation check, data transfer from a child card, various certificate authentication processing, service code matching confirmation, etc. can be executed the processing program stored in the commuter's ticket vending machine 402 as a reader/writer under the control of a service providing entity shown in FIG. 16. Also, the above processing can be executed by reading and executing an upper application program stored in the child card 401. Accordingly the control of whether the lower application of the child card is enabled execution or disabled execution as an error is performed either under the control of a reader/writer managed by the service providing entity, or the upper application program stored in the child card 401.

Also, for the processing between the child card 401 in FIG. 16 and the reader/writers 403 and 404 installed as a station ticket gate, mutual authentication of step S601 in the processing flow in FIG. 17 uses the common-key authentication, and it is preferable that the subsequent processing to the authentication is omitted, or simplified.

Figure 18:
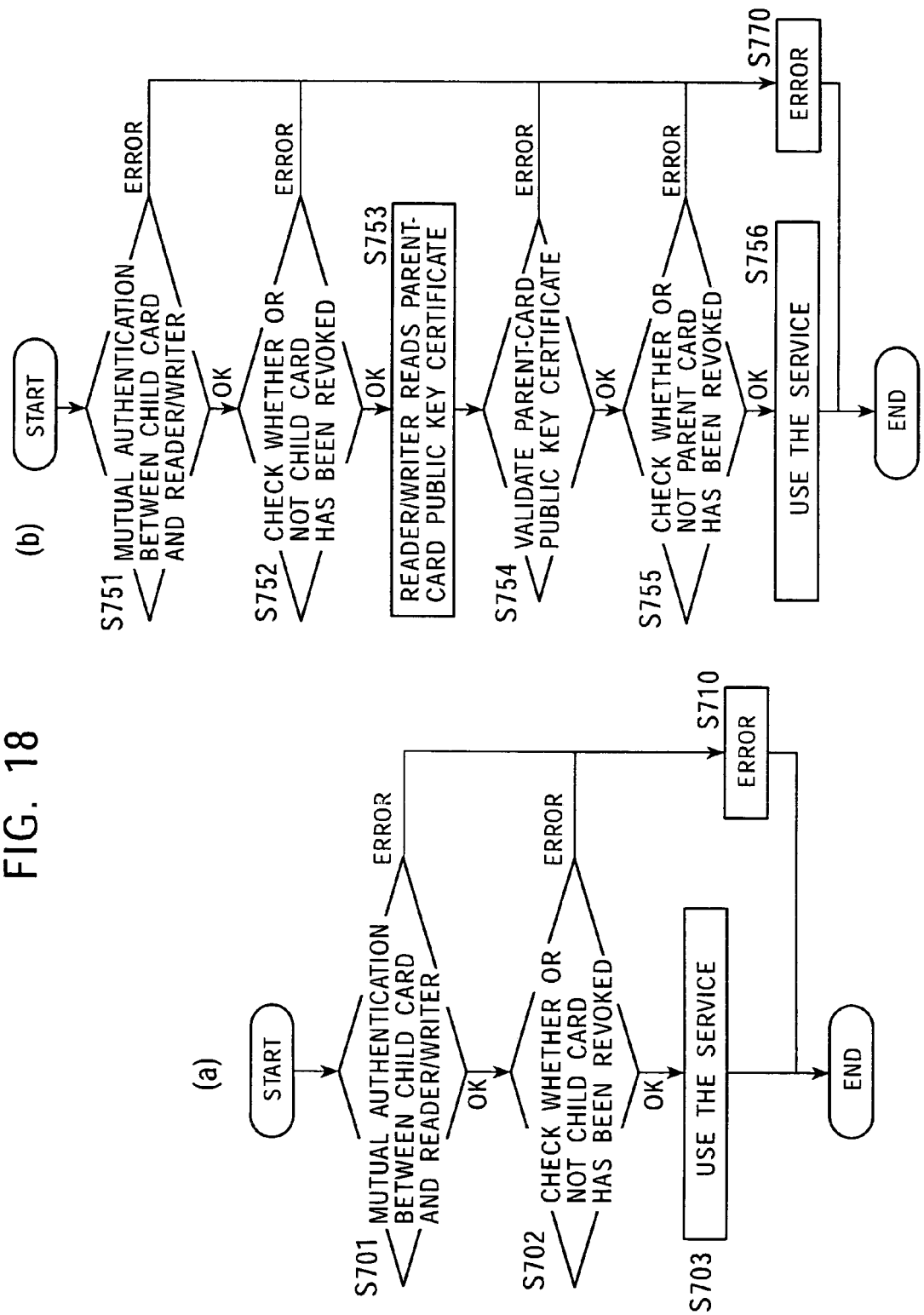
FIG. 18 is a flowchart illustrating the use example of the child-card in the present invention.

FIG. 18 shows a child-card use processing flow example based on the lower application of a child card. The processing example in FIG. 10(a) is an example which executes only mutual authentication and revocation check of a child card between a child card and the reader/writer (for example, station ticket gate).

In step S701, mutual authentication by the common-key system is executed between the child card and the reader/writer (for example, station ticket gate). This is executed as, for example, the processing described using FIG. 4 before, has smaller processing load than the public-key system, and is possible for more speedy processing. In this regard, also in this case, if the station ticket gate is apparently valid, one-way authentication, in which the reader/writer (for example, station ticket gate) only performs authentication processing of the child card, may be applied. If the authentication has failed, the processing is aborted as an error (S710). That is, the door of the ticket gate is closed.

When the authentication has succeeded, in step S702, the reader/writer (R/W) validates whether the child card has been revoked. The revocation check is executed by processing of checking whether or not the ID received from the child card is not included on the revocation list in the database connected to the reader/writer (R/W), that is, the illegal card identification (ID) list. If the ID received from the child card is included on the revocation list, the card is determined as an illegal card, the processing is determined as an error, and the subsequent processing is not executed and the processing is terminated.

When the child card has not been revoked, the next step S703, that is, the service is executed. In the example of the commuter's ticket use example, opening and closing of the ticket gate is carried out corresponding to the use section and the use time period data set as a commuter's ticket.

FIG. 18(b) is the processing in which the processing for executing the parent card revocation validation is added toe the processing in FIG. 18(a). The processing in steps S751 and S752 are the authentication processing by the common-key system with the child card in the same way as the processing in FIG. 18(a), and the child card revocation validation processing.

In step S753, the reader/writer (R/W) reads "parent card public-key certificate" stored in the child card.

Next, in step S754, the reader/writer (R/W) validates "parent card public-key certificate" which has been read from the child card. If determination is made that the data has not been altered, that is, it is the legitimate "public-key certificate of the certificate authority which issued the parent card public-key certificate", in step S755, validation is performed of that the identification (ID) of the certificate authority taken from the "parent card public-key certificate" is not registered on the revocation list. If the parent-card ID is included in the revocation list, the public-key certificate is determined to have been revoked and not valid, thus it is determined as an error (S770), the subsequent processing is not executed, and the processing is terminated.

When the parent card has not been revoked, the next step S756, that is, the service is executed. In the case, opening and closing of the ticket gate is carried out corresponding to the use section and the use time period data set as a commuter's ticket.

Other than FIGS. 18(a) and 18(b), the processing can be set in various forms. These forms can be arbitrary set by the service provider managing the processing. Specifically, the processing is executed depending on the application program stored in the child card.

[Application Forms for Other Child Cards]

In the embodiment described above, the example having a structure in which one application (upper application) is set for a child card, and various applications can be set as the lower service applications is shown. However, it is possible to set a plurality of independent applications corresponding to a plurality of service codes as upper applications in one child card.

Specifically, one child card can store applications corresponding to services provided by individually different service providers as an application "a" and an application "b". For an actual example, an application "a" and an application "b" can be set in the child card in an executable state such that an application "a" is set to, for example, a service which issues a commuter's ticket and the other railway tickets with setting the service provider to a railway company, and an application "b" provides a service of electronic money with setting the service provider to a bank.

The issue processing of a child card of such a complex type can be carried out by either one of the service providers on consignment from the other service provider, following the similar process as the child-card issue processing in FIG. 7. In this case, the child card stores the issue certificates corresponding to an application "a" and an application "b".

Also, a plurality of applications may not be stored in the child card at the time of issuing the child card, and an application or an issue certificate of an application can be stored additionally. For example, a user, who has an issued child card in which application "a" is stored, and an issue certificate corresponding to an application "a" is stored, may set the child card along with the parent card in a child-card issue machine (reader/writer) installed at the child-card issue agency of the service provider, such as a bank, who manages the other application "b" in order to execute the processing to store the upper application "b" or the issue certificate of the application "b".

In this regard, in either case, the issue condition is that the child-card issue history table contains the child-card issue permission corresponding to service codes of both the application "a" and the application "b".

Figure 19:
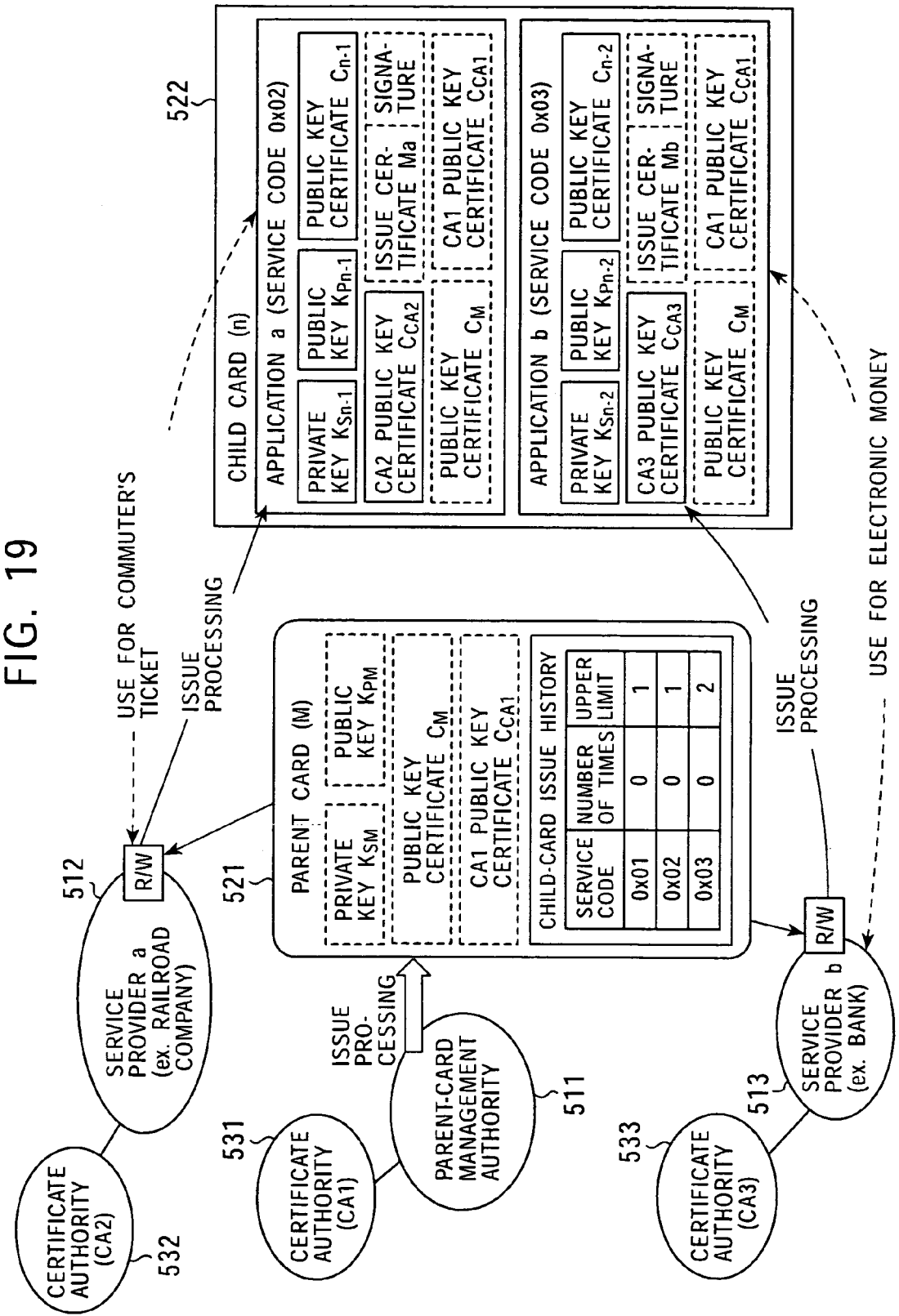
FIG. 19 is a diagram illustrating the data storage example of the child card in the present invention.

A description will be given of the case where a plurality of applications are stored in one piece of child card. For example, as shown in FIG. 19, suppose there are a service provider "a" (for example, railway company) 512 and a service provider "b" (for example, bank) 513, and the service provider "a" (for example, railway company) 512 provides a service for issuing a commuter's ticket and the other railway ticket described above, and the service provider "b" (for example, bank) 513 provides a service such as settlement of electronic money, etc.

The user has already received the parent card (M) 521 from the parent-card management authority 511, and the parent card (M) 521 stores a "private key K(SM)", a "public-key K(PM)" which have been set for the parent card, a "public-key certificate C(M)" and the "certificate authority CA1's public-key certificate" which have been issued by the certificate authority (CA1) 531, and the child-card issue history table.

The user sets the parent card in the reader/writer (R/W) of the service provider "a" (railway company) 512 based on the parent card, and requests issue processing of the child card. The child card stores a "private key K(Sn-1)", a "public-key K(Pn-1)" which are set corresponding to the application "a" (service code 0x02), "public-key certificate C(n-1) which has been issued by the certificate authority (CA2) 532", and "certificate authority CA2's public-key certificate C(CA2)", and further stores the "issue certificate—Ma" and the "parent-card public-key certificate C(M)" which have a signature by the private key K(SM) of the parent card 521", and the "public-key certificate C(CA1) of the certificate authority (CA1) 531" which has issued the public-key certificate of the parent card.

Further, the user sets the parent card in the reader/writer (R/W) of the service provider "b" (bank), and requests issue processing of the child card. The child card stores a "private key K(Sn-2)", a "public-key K(Pn-2)" which are set corresponding to the application "b" (service code 0x03), "public-key certificate C(n-2) which has been issued by the certificate authority (CA3) 533", and "certificate authority CA3's public-key certificate C(CA3)", and further stores the "issue certificate—Mb" and the "parent-card public-key certificate C(M)" which have a signature by the private key K(SM) of the parent card 521", and the "public-key certificate C(CA1) of the certificate authority (CA1) 531" which has issued the public-key certificate of the parent card.

In this way, when a plurality of different applications are stored in a child card, it is possible to use different services provided by a plurality of service providers based on this one child card.

Figure 20:
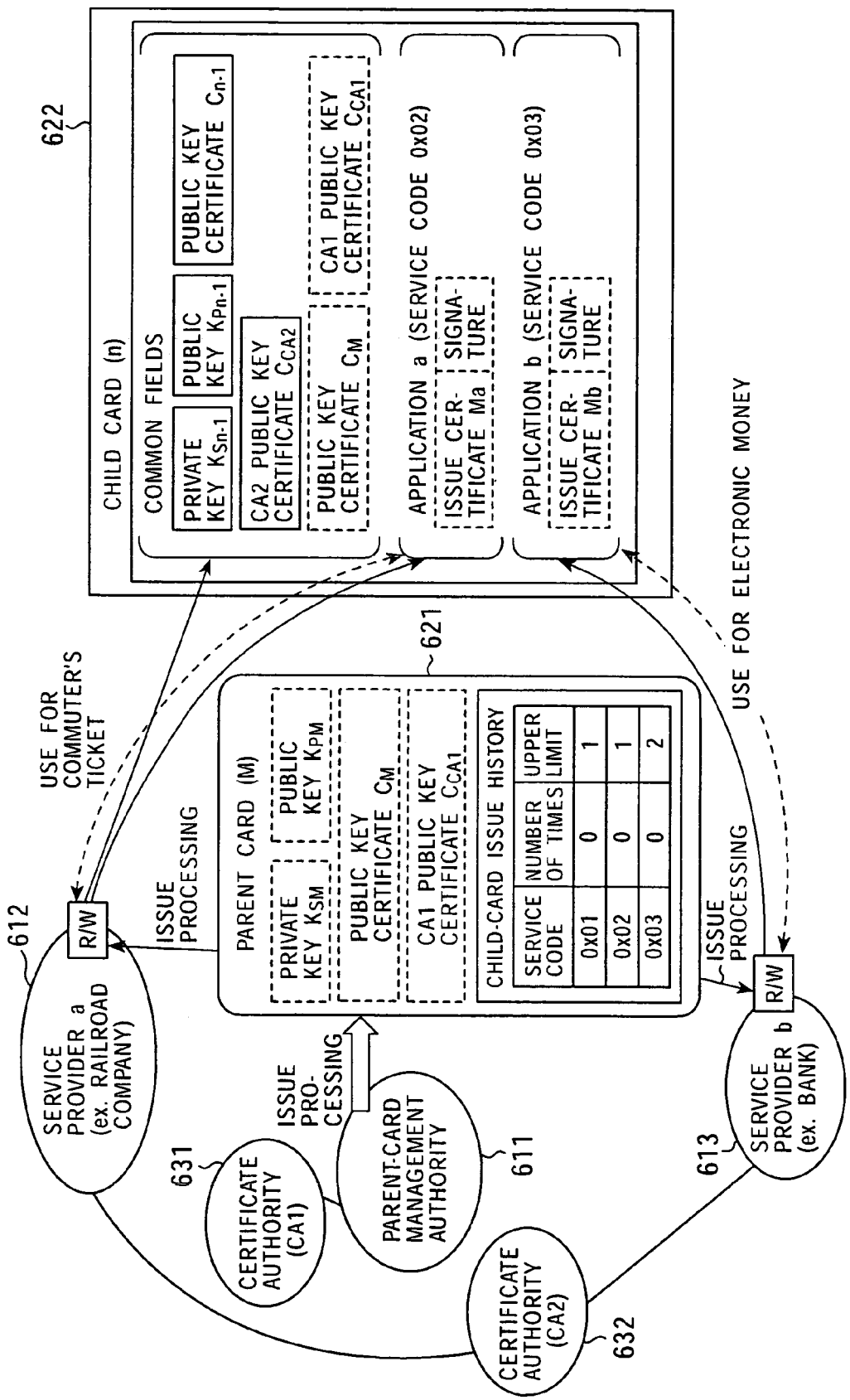
FIG. 20 is a diagram illustrating the data storage example of the child card in the present invention.

In this regard, in FIG. 19, a child-card private key, public key, public-key certificate, etc. are individually stored for each of a plurality of applications. However, a common fields, which can be used by different applications, may be set in a child card, commonly used data may be stored in the common fields, and only individual data, such as issue certificate, etc. for each application is stored in each application field. FIG. 20 shows a structure example of a child card which has such a structure.

The child card 622 is provided with a common fields, the common fields store a "private key K(Sn-1)", a "public-key K(Pn-1)", "public-key certificate C(n-1) which has been issued by the certificate authority (CA2) 632", and "certificate authority CA2's public-key certificate C(CA2)", and further store "parent-card public-key certificate C(M)", and the "public-key certificate C(CA1) of the certificate authority (CA1) 631" which has issued the public-key certificate of the parent card.

These common fields data are stored by the child-card issue agency which issues a child card based on the parent card 621 at first. For example, when a service provider "a" 612 issue a child card 622 based on the parent card 621 at first, it stores, for each data of the common fields, a "private key K(Sn-1)", a "public-key K(Pn-1)", a "public-key certificate C(n-1) which has been issued by the certificate authority (CA2) 632", and "certificate authority CA2's public-key certificate C(CA2)", and further, "parent-card public-key certificate C(M)", and the "public-key certificate C(CA1) of the certificate authority (CA1) 631" which has issued the public-key certificate of the parent card, and for individual data for an application "a", the "issue certificate—Ma" which has a signature by the private key K(SM) of the parent card 621.

Furthermore, when storing an application corresponding to another service code, the data which is available in the application and is other than the data stored in the common fields are stored in an application field. The data necessary for enabling the child card 622 to execute the service of the service provider 613 is only the "issue certificate—Mb" in addition to the data currently stored in the common fields. The service provider "b" 613 stores the "issue certificate—Mb" which has a signature by the private key K(SM) of the parent card 621 as individual data of the application "b". In the case of the structure shown in this FIG. 20, the service provider "a" 612 and the service provider "b" 613 can use the public-key certificate obtained as a result of the authentication by the common certificate authority (CA2), and thus each application field may store only an issue certificate.

Figure 21:
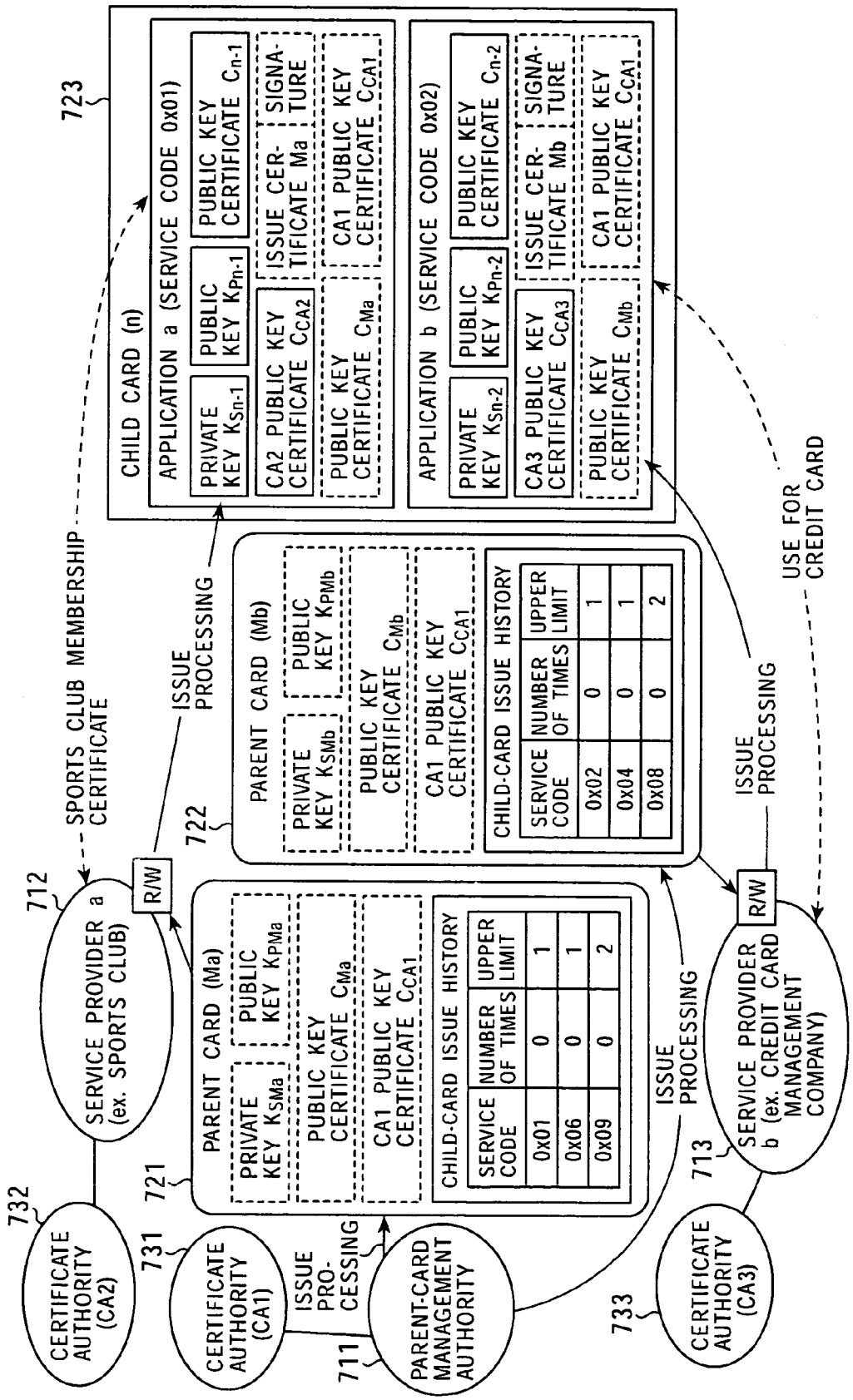
FIG. 21 is a diagram illustrating the data storage example of the child card in the present invention.

In the example described above, a description has been given of the case in which one or more child cards are issued for one parent card. However, as shown in FIG. 21, one child card may have a structure in which service applications based on different parent card. For example, there is a case in which an underage person or student, who does not have his/her own parent card, possesses a child card corresponding to services to which each parent card has an issue permission based on two parent cards possessed by both parents, for example, a parent card of the father and a parent card of the mother.

For example, when the farther possesses a parent card which has an issue permission of a membership of a sports club, whereas the mother possesses a parent card which has an issue permission of a credit card applicable to a shopping center, it becomes possible to issue a child card which is available for a plurality of services by issuing the child card based on these two different parent cards.

As shown in FIG. 21, two pieces of the parent card (Ma) 721 and the parent card (Ma) 722 store individually different child-card issue history tables, and the service codes of the child card having issue permission are different. A plurality of applications are stored in the child card 723 based on these parent cards.

First, a user, who tries to perform issue processing of a child card, sets the parent card (Ma) 721 in the reader/writer (R/W) of the service provider "a" (sports club) 712 based on the parent card (Ma) 721, and requests issue processing of a child card. The child card stores a "private key K(Sn-1)", a "public-key K(Pn-1)" which are set corresponding to the application "a" (service code 0x01), a "public-key certificate C(n-1) which has been issued by the certificate authority (CA2) 732", and "certificate authority CA2's public-key certificate C(CA2)", and further stores the "issue certificate—Ma" and the "parent-card (Ma) public-key certificate C(Ma)" which have a signature by the private key K(SMa) of the parent card 721", and the "public-key certificate C(CA1) of the certificate authority (CA1) 731" which has issued the public-key certificate of the parent card (Ma).

Furthermore, the user sets another parent card (Mb) 722 in the reader/writer (R/W) of the service provider "b" (credit card management company) 722, and requests issue processing of an additional application of a child card. The child card 723 stores a "private key K(Sn-2)", a "public-key K(Pn-2)" which are set corresponding to the application "b" (service code 0x02), a "public-key certificate C(n-2) which has been issued by the certificate authority (CA3) 733", and "certificate authority CA3's public-key certificate C(CA3)", and further stores the "issue certificate—Mb" and the "parent-card (Mb) public-key certificate C(Mb)" which have a signature by the private key K(SMb) of the parent card 722", and the "public-key certificate C(CA1) of the certificate authority (CA1) 731" which has issued the public-key certificate of the parent card (Mb).

In this way, when a plurality of different applications are stored in a child card, it is possible to use different services provided by a plurality of service providers based on this one child card.

Next, with reference to FIG. 22, a description will be given of the processing example in which, in child-card issue processing based on a parent card, tied information based on the parent card is stored in the child card, generation of the tied information and the tied-information storage processing for the child card are executed in the tied-certificate issue system, further, for the child card which stores the tied information issued by the tied-information storage processing, data (value) corresponding to the use purpose of the child card is stored by a tied-value issue system. In this regard, in the figure, any one of the tied-certificate issue system 753, the tied-value issue system 754, and the value-use machine 755 has a function of a reader/writer, and is capable of data read/write from/to an IC card.

Figure 22:
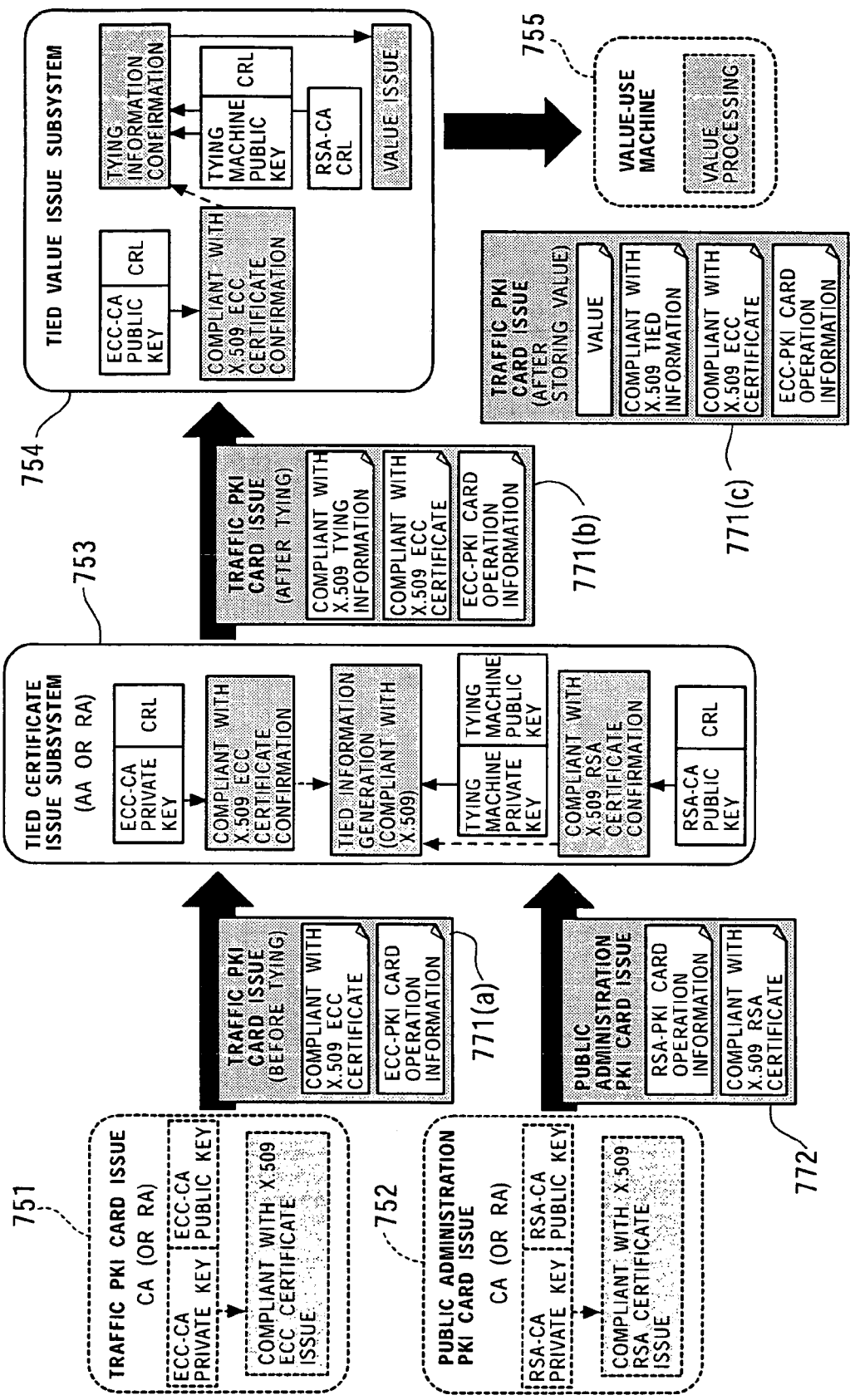
FIG. 22 is a diagram illustrating the child-card issue processing example in the present invention.

In the example shown in FIG. 22, a traffic PKI (Public Key Infrastructure) card issue CA (or RA) authority 751 stores commuter's ticket information of traffic means, for example, operation information of railway pass information as ECC-PKI card operation information along with the public-key certificate (ECC) in a child card, and issues the child card as a traffic PKI card (before tying) 771(a). Also, a public administration PKI card issue CA (or RA) authority 752 issues the parent card of the same user, and issues a public administration PKI card 772 which stores operation information including various information, for example, birth year and date, address, telephone number, etc. as personal information specific to the user.

Here, the traffic PKI (Public Key Infrastructure) card issue CA (or RA) authority 751 issues a public-key certificate based on the elliptic curve cryptography (ECC) algorithm, and the issued public-key certificate has a digital signature by the private key of the traffic PKI card issue CA (or RA) authority. At the same time, public administration PKI card issue CA (or RA) authority 752 issues a public-key certificate based on the RSA algorithm, and the issued public-key certificate has a digital signature by the private key of the public administration PKI card issue CA authority.

The tied-certificate issue subsystem 753 reads the storage from these two cards, and performs tying processing on the traffic PKI card (before tying) 771(a) as a child card based on the public administration PKI card 772 of the same user. Specifically, necessary information is extracted from the public administration PKI card 772 of the same user corresponding to the traffic PKI card (before tying) 771(a), the tied information is generated based on the extracted information, the generated tied information is stored in the traffic PKI card 771(a), and the traffic PKI card (after tying) 771(b) is generated.

A description will be given of the processing sequence in the tied-certificate issue system 753. The tied-certificate issue system 753 takes out the public-key certificate (ECC(compliant with X.509)) from the traffic PKI card 771(a) which constitutes as an IC card (child card), and executes signature validation of the public-key certificate. The signature validation is executed using the public key of the traffic PKI card issue CA authority. Furthermore, along with the signature validation, a revocation check is performed, and validation of whether or not the public-key certificate is an illegal certificate on the revocation list is executed.

Further, The tied-certificate issue system 753 takes out the public-key certificate (RSA(compliant with X.509)) from the public administration PKI card 772 which constitutes as an IC card (parent card), and executes signature validation of the public-key certificate. The signature validation is executed using the public key of the public administration PKI card issue CA authority. Furthermore, along with the signature validation, a revocation check is performed, and validation of whether or not the public-key certificate is an illegal certificate on the revocation list is executed.

When validation of these parent card and child card is executed, and both cards are validated that they store legitimate public-key certificate which belongs to the same user, the tied-certificate issue subsystem 753 generates the tied information (for example, compliant with X.509) based on each card storage information. The tied information can be generated, for example, in accordance with the format of the attribute certificate in compliance with X.509. The information necessary for the use of the traffic PKI card is extracted from storage information in the public administration PKI card and is stored in the traffic PKI card. For example, if the traffic PKI card is a respect-for-the-aged pass, which is issued to the user who is older than a certain age, birth-date data to be determined the age, or address data necessary for setting a boarding section, etc. is extracted from the storage information in the public administration PKI card, and stored in the tied information. The tied information is constituted from different information depending on the child card function.

The tied-certificate issue system 753 attaches a signature by the private key of the tied-certificate issue system 753 to the extracted information, and the other information constituting the attribute certificate. The signature enables validation of data alteration. In this regard, the attribute certificate includes link information of the public key, and it is possible to identify the public-key certificate corresponding to the user based on the attribute certificate. Accordingly, when validating the attribute certificate, in addition to the validation of the signature attached to the attribute certificate, the public-key certificate can be identified based on the link information of the public-key certificate stored in the attribute certificate, and validation of the public-key certificate, revocation check, etc. can be performed.

The tied-certificate issue system 753 outputs the traffic PKI card (after tying) 771(*b*) which has newly stored tying information (for example, an attribute certificate) by the above processing. When actually using the traffic PKI card (after tying) 771(*b*), the user stores value information in the traffic PKI card (after tying) 771(*b*) in the tied-value issue system 754. The value information is, for example, in the case of using as a traffic pass, an available section, an available time period, or available amount, etc. The value-use machine 755 reads the value information stored in the traffic PKI card to enable to use.

A description will be given of the processing in the tied-value issue system 754. First, the tied-value issue system 754 takes out the public-key certificate (ECC(compliant with X.509)) from the traffic PKI card 771(*b*), and executes signature validation of the public-key certificate. The signature validation is executed using the public key of the traffic PKI card issue CA authority. Furthermore, along with the signature validation, a revocation check is performed, and validation of whether or not the public-key certificate is an illegal certificate on the revocation list is executed.

When validation of the public-key certificate is completed, the tied information (attribute certificate (compliant with X.509)) is fetched and signature validation of the tied information is executed. The signature validation is executed using the public-key of the tied-certificate issue subsystem 753. Furthermore, the public-key certificate (RSA) stored in the public administration PKI card 772 as a parent card is identified based on the link information of the public-key certificate stored in the attribute certificate, and validation of the public-key certificate (RSA) and revocation check are performed.

As a result of the validation described above, when the card is confirmed that it is the traffic PKI card as a child card which stores a valid public-key certificate, and further the user has a public administration PKI card which stores a valid public-key certificate as a parent card, the tied-value issue system 754 stores the value information which consists of the available use section, available time-period, or available amount in the traffic PKI card, and issues the traffic PKI card (after storing value) 771(*c*).

When the user received the traffic PKI card (after storing value) 771(*c*), he or she can use the traffic PKI card (after storing value) 771(*c*) by executing data read of the traffic PKI card (after storing value) 771(*c*) by the value-use machine 755 as the reader/writer set in each traffic means such as railways, buses, and so on.

In this regard, in the embodiment described above, when sending and receiving data with an IC card, all of the tied-certificate issue system 753, the tied-value issue system 754, and the value-use machine 755 preferably execute authentication processing between each system and an IC card, and then execute various data transfer processing on the condition of the authentication approval.

[Structure of Reader/writer]

Figure 23:
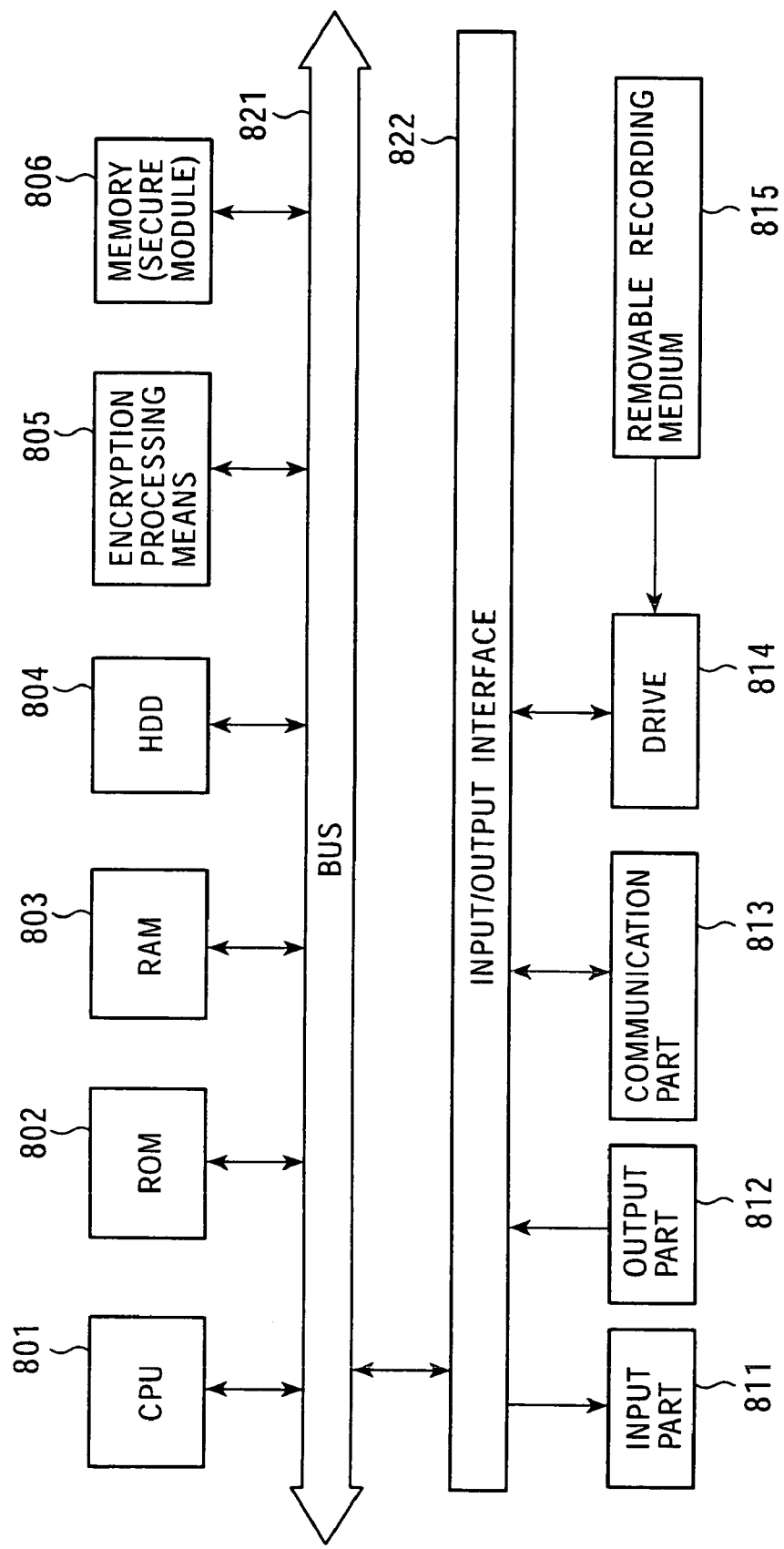
FIG. 23 is a diagram illustrating the reader/writer (R/W) configuration in the present invention.
Figure 24:
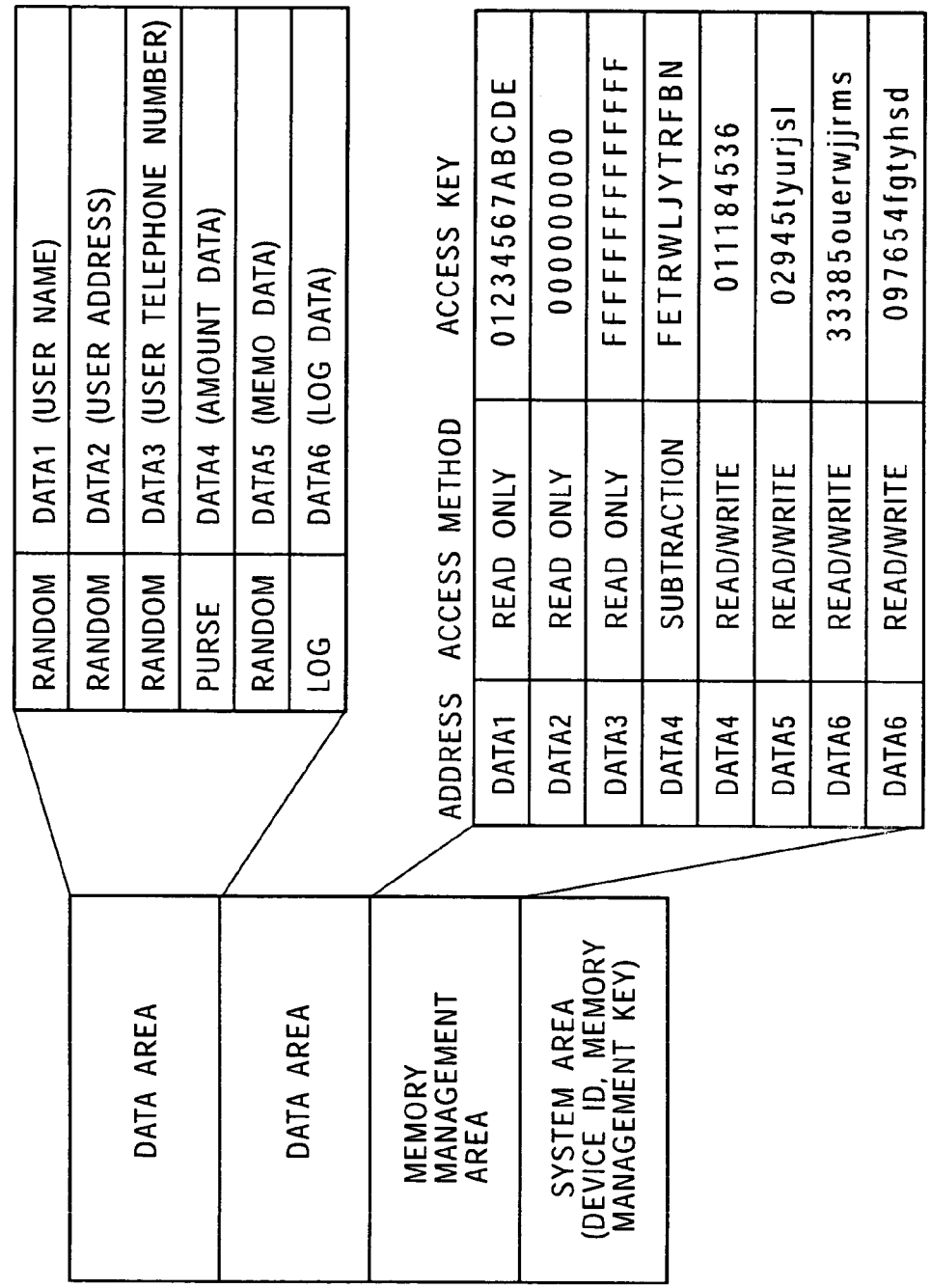
FIG. 24 is a diagram illustrating the memory area structure of the conventional memory device.
Figure 25:
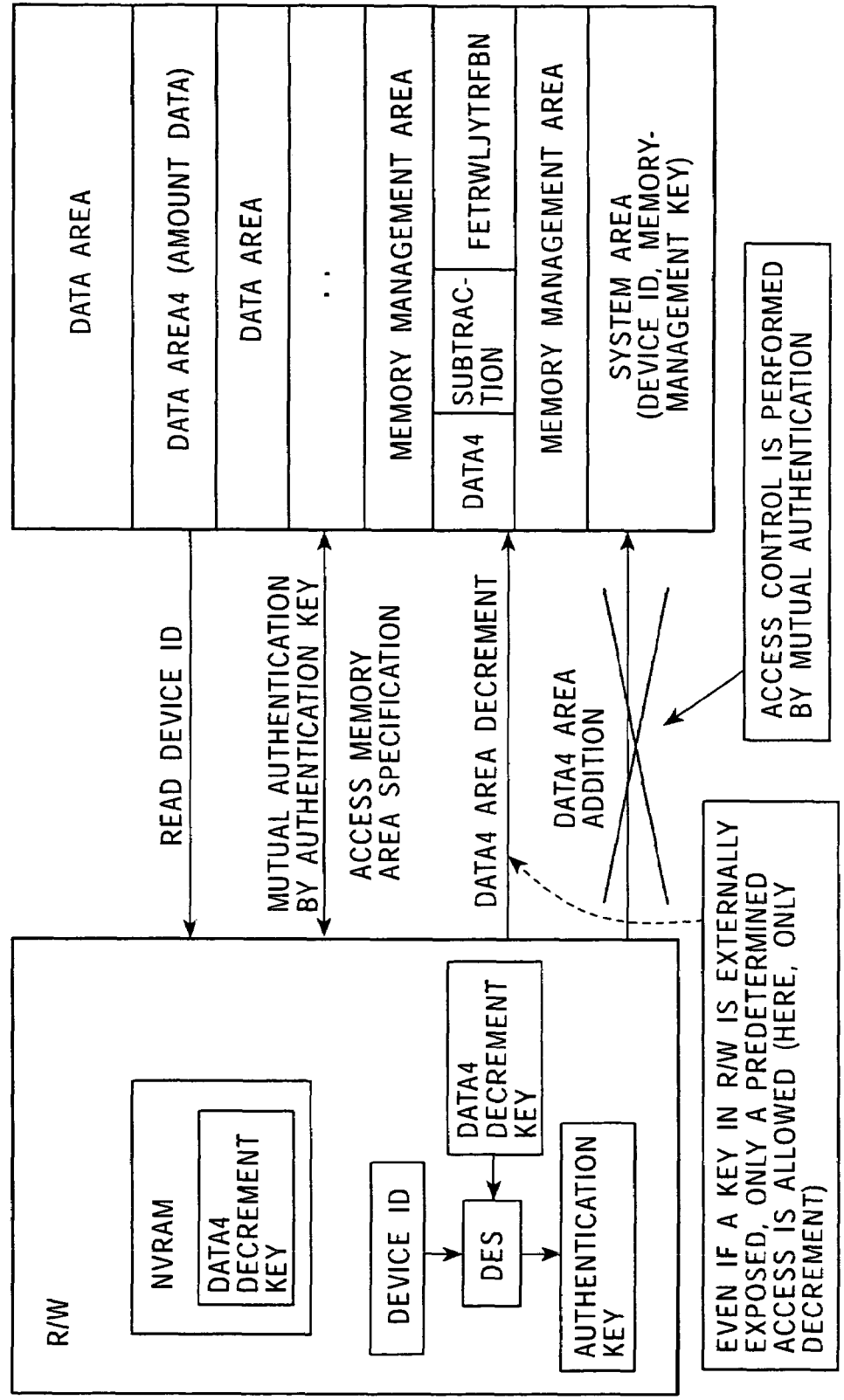
FIG. 25 is a diagram illustrating the use example of the conventional memory device.

A description will be given of the structure example of the reader/writer which executes the issue processing of the above-described parent card or the child card, and authentication processing, and so on. The reader/writer is provided with interface means capable of data input/output with a card to be set, and can be achieved by data processing means such as a PC, etc., which has a CPU (Central Processing Unit) as control means. FIG. 23 shows the structure example of the reader/writer. In this regard, the structure example of the reader/writer shown in FIG. 23 is one example, and a reader/writer does not needs all the functions shown here. The CPU (Central Processing Unit) 801 is a processor which executes various application programs and an OS (Operating System). A ROM (Read-Only-Memory) 802 stores programs executed by the CPU 801, or fixed data as operation parameter. A RAM (Random Access Memory) 803 is used for storage area and work area for the programs executed in the processing of CPU 801, and parameters which varies appropriately in the program processing.

A HDD 804 executes control of a hard disk, and executes storage processing and read processing of various data and programs for the hard disk. An encryption processing means 805 executes encryption processing of send data, decryption processing, authentication processing, etc. In this regard, here, an example, in which encryption processing mean is made as an independent module, is shown. However, for example, encryption processing program may be stored in the ROM 802, and the program stored in the ROM may be read and executed by the CPU 801 without having such an independent encryption processing module. A memory (secure module) 806 is composed of, for example, a memory having a tamperproof structure, and can be used for storage area of key data necessary for encryption processing and access permission certificate. In this regard, these data can be stored in another memory area and storage medium.

A bus 821 is composed of a PCI (Peripheral Component Internet/Interface) bus, etc., and enables data transfer with each input/output device via each module and an input/output interface 822.

An input part 811 is an input part including, for example, a keyboard, a pointing device, and a card interface. When the input part 811 detects that a card has been set, or the input part 811 is operated through a keyboard, mouse, etc., or a communication part 813 receives data from a card, a command is input into the CPU 801, and the programs stored in the ROM (Read Only Memory) 802. An output part 812 is, for example, a CRT, a liquid crystal display, etc., and displays various types of information by a text or an image, etc.

The communication part 813 executes communication with the card connected to the reader/writer, or executes communication processing with the other entities, for example, a service provider, a database server, and a certificate authority, and, under the control of the CPU 801, executes sending of data supplied from each storage part, or data which the CPU 801 has processed, and the encrypted data, and executes receiving data from the other entities.

A drive 814 is a drive to execute recording/reproducing of a removable recording medium 815, for example, a floppy disk, a CD-ROM (Compact Disc Read Only Memory), an MO (Magneto Optical) disk, a DVD (Digital Versatile Disc), a magnetic disk, a semiconductor memory, etc., and executes a program and data reproduction from each removable recording medium 815, or executes storage of a program or data into the removable recording medium 815.

When reading a program or data recorded in each recording medium and is executed or processed in CPU 801, the read program or data is supplied to, for example, the connected RAM 803 through the input/output interface 822 and the bus 821.

The program which executes processing in a reader/writer described in the present specification or using drawings, for example, each processing of a card issue, card use, etc., is processed, for example, is stored in the ROM 802 and processed by the CPU 801, or is stored in a hard disc and is supplied to the CPU 801 through the HDD 804 to be executed.

In the above, the present invention is described in detail, referring to specific embodiments. However, it is apparent that those skilled in the art can modify or substitute the embodiments without departing from the spirit and scope of the present invention. That is, the present invention has been disclosed as examples, and should not be interpreted as limited to the disclosed embodiments. In order to determine the spirit and scope of the present invention, the claims section described at the top of the specification should be taken into consideration.

In this regard, a series of processing described in the specification can be executed by hardware, or software, or a composite structure of the both. When executing processing by software, a processing-sequence recorded program may be installed in a memory in the computer installed in a dedicated hardware, or the program may be installed on a general-purpose computer capable of executing carious processing.

For example, the program can be recorded in a hard disk or ROM (Read Only Memory) in advance. Alternatively, the program can be temporarily or permanently stored (recorded) in a removable recording medium, for example, a floppy disk, a CD-ROM (Compact Disc Read Only Memory), an MO (Magneto Optical) disk, a DVD (Digital Versatile Disc), a magnetic disk, a semiconductor memory, etc. Such a removable recording medium can be provided as a so-called software package.

In this regard, in addition to installing the program to the computer from a removable recording medium, the program can be transferred by wireless from the download site, or transferred by wired via a network, such as a LAN (Local Area Network), and the Internet, and the computer can receive the transferred program to install in a recording medium such as an internal hard disk, etc.

In this regard, various processing described in the specification is not only executed in time-series in accordance with the description, but may be executed in parallel or independently depending on the processing power of the processing unit or as necessary. Also, in the present invention, a system means a logically assembled components of a plurality of devices, and each component device is not always contained in a same housing.

INDUSTRIAL APPLICABILITY

As described above, by a data processing system, a memory device, a data processing unit, and a data processing method and program of the present invention, a card as a memory device, which is applied in order to use various services, is provided as one child card or more (second memory device), data for issue management of the child card is stored in a parent card (fist memory device), and issue processing of the child card (second memory device) is performed by executing authentication, etc. of the parent card (fist memory device), and thus a child card necessary for using the service is prevented from being issued mistakenly.

Further, by a data processing system, a memory device, a data processing unit, and a data processing method and program of the present invention, a card as a memory device, which is applied in order to use various services, is provided as one child card or more (second memory device), an issue certificate having a digital signature of the parent card (fist memory device) is stored in each child card, and the issue certificate stores a service code and a child-card identification, and thus confirmation processing of the service set in the child card becomes possible based on the issue certificate by the signature data of the parent card.

Furthermore, by a data processing system, a memory device, a data processing unit, and a data processing method and program of the present invention, a card as a memory device, which is applied in order to use various services, is provided as one child card or more (second memory device), child-card issue management data is stored in the parent card (fist memory device), the child card stores not only the public key of the child card, but the public-key certificate of the parent card, and thus it becomes possible to check the revocation status of the parent card, which is the issue management source of the child card, based on a child card.

Moreover, by a data processing system, a memory device, a data processing unit, and a data processing method and program of the present invention, a card as a memory device, which is applied in order to use various services, is provided as one child card or more (second memory device), a public-key system authentication is executed at the issue processing of a child card, a common-key system capable of high-speed processing is applied when using the service to which the child card is applied, and thus it becomes possible to separate authentication as follows: a rigid authentication for issue management of a child card and high-speed authentication at the time of using the service.

The invention claimed is:

1. A data processing system comprising:
a first memory device which includes data storage means and data control means; and
a second memory device which includes data storage means and data control means,
wherein the first memory device stores an issue-management table concerning the second memory device,
the second memory device stores an application program which executes data processing to which the second memory device is applied, and also stores an issue certificate having a digital signature by a private key associated with the first memory device for data including a service code for identifying the application program;
issue processing of the second memory device or execution processing of the issue processing of the issue certificate for the second memory device is performed based on the issue-management table stored in the first memory device; and
a tied certificate issue system for generating tied information necessary for use of the second memory device based on information extracted from both the first memory device and the second memory device; the tied information is generated in a format of a public key certificate, the generated tied information is stored in the second memory device.

2. A data processing system according to claim 1, wherein the first memory device stores a public key and a private key which are applicable to a public-key cryptography, and an issue-processing control program of the second memory device, and an issue is made by a management device of the first memory device management entity, the second memory device stores the public key and the private key which are applicable to the public-key cryptography on the condition that authentication by the public-key system of the first memory device is approved, an application program which executes data processing in which the second memory device is applied is stored, and an issue is made by a management device of the second memory device management entity.

3. A data processing system according to claim 1, wherein the first memory device stores an execution control application program of the second memory device issue processing, or the issue certificate issue processing, and performs control of the second memory device issue processing, or the issue certificate issue processing in accordance with the application program.

4. A data processing system according to claim 1, wherein the issue-management table stored in the first memory device is a table on which the service code, an issue upper limit number of the second memory device or the issue certificates, and a number of already issued correspond with each other, the issue processing of the second memory device or the issue certificate is executed on the condition that data on the issue management table corresponding to the service code of the issue processing holds: number of already issued<number of issue upper limit.

5. A data processing system according to claim 1, wherein the second memory device issue processing or issue processing of the issue certificate is executed on the condition of at least either authentication between the first memory device and the second memory device by a public-key cryptography is approved, or authentication between the first memory device and a device for executing the issue processing of the second memory device, or issue processing of the issue certificate by a public-key cryptography is approved.

6. A data processing system according to claim 1, wherein the second memory device issue processing or issue processing of the issue certificate is executed on the condition that the memory device identification (ID) of the first memory device is not registered in a revocation list storing an identification (ID) of an illegal device.

7. A data processing system according to claim 1, wherein the second memory device issue processing or issue processing of the issue certificate is executed on the condition of at least either authentication between the second memory device and the first memory device by a public-key cryptography is approved, or authentication between the second memory device and a device for executing the issue processing of the second memory device, or issue processing of the issue certificate by a public-key cryptography is approved.

8. A data processing system according to claim 1, wherein the issue certificate stored in the second memory device has a digital signature by a private key peculiar to the first memory device for data which includes a service code for identifying data processing to which the second memory device is applied, and an identification (ID) of the second memory device.

9. A data processing system according to claim 1, wherein the second memory device stores an application program which executes a service corresponding to a service code identifying data processing to which the second memory device is applied together with the service code.

10. A data processing system according to claim 1, wherein the second memory device stores an application program which executes a service corresponding to the service code, the application program includes a lower application program which executes data processing on the condition of authentication approval by a common-key system, and an upper application program which performs execution control of the lower application program.

11. A data processing system according to claim 1, wherein the second memory device stores an application program which executes a service corresponding to the service code, the second memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition of the authentication approval.

12. A data processing system according to claim 1, wherein the second memory device stores an application program which executes a service corresponding to the service code, the second memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition that the authentication is approved and the memory device identification (ID) of the memory device is not registered in a revocation list storing an identification (ID) of an illegal device.

13. A data processing system according to claim 1, wherein the second memory device stores an application program which executes a service corresponding to the service code, the second memory device has a lower application program which executes data processing on the condition of authentication approval by a common-key system, and an upper application program which performs execution control of the lower application program, the upper application program executes authentication processing between the second memory device and an entity management device, which is a service providing entity corresponding to the service code, by a public-key system, and controls to enable execution of the lower application program on the condition that the authentication is approved and a service code corresponding to the upper application program and a service code stored in the issue certificate are identical.

14. A data processing system according to claim 1, wherein the second memory device stores an application program which executes a service corresponding to the service code, the second memory device has a lower application program which executes data processing on the condition of authentication approval by a common-key system, and an upper application program which performs execution control of the lower application program, the upper application program executes authentication processing between the second memory device and an entity management device, which is a service providing entity corresponding to the service code, by a public-key system, and controls to enable execution of the lower application program on the condition that the authentication is approved.

15. A data processing system according to claim 1, wherein the second memory device stores an application program which executes a service corresponding to the service code, the second memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and the management device controls to enable execution of the lower application program on the condition that the authentication is approved and the memory device identification (ID) of the memory device is not registered in a revocation list storing an identification (ID) of an illegal device.

16. A data processing system according to claim 1, wherein the second memory device stores an application program which executes a service corresponding to the service code, the second memory device has a lower application program which executes data processing on the condition of authentication approval by a common-key system, and an upper application program which performs execution control of the lower application program, the upper application program executes authentication processing between the second memory device and an entity management device, which is a service providing entity corresponding to the service code, by a public-key system, and the management device controls to enable execution of the lower application program on the condition that the authentication is approved and a service code corresponding to the upper application program and a service code stored in the issue certificate are identical.

17. A data processing system according to claim 1, wherein the first memory device performs execution control of issue processing of a plurality of the second memory devices, or issue certificate issue processing for the second memory device based on the issue-management table stored in the first memory device.

18. A data processing system according to claim 1, wherein the first memory device stores a public key, a private key, and a public-key certificate which are applied to a public-key cryptography, and also stores a public-key certificate or a public-key of a certificate authority, which is the public-key certificate issue entity.

19. A data processing system according to claim 1, wherein the second memory device stores a public key, a private key, and a public-key certificate which are applied to a public-key cryptography, and also stores a public-key certificate or a public-key of a certificate authority, which is the public-key certificate issue entity.

20. A data processing system according to claim 1, wherein the second memory device stores a plurality of different application programs corresponding to a plurality of different service codes, and also stores a plurality of issue certificates corresponding to a plurality of application programs.

21. A data processing system according to claim 1, wherein the second memory device stores a plurality of different application programs corresponding to a plurality of different service codes, and also stores a plurality of issue certificates corresponding to a plurality of application programs, the plurality of issue certificates are certificates on which issue processing is performed based on an issue-management table of a same first memory device, and have a digital signature by a private key peculiar to a same first memory device.

22. A data processing system according to claim 1, wherein the second memory device stores a plurality of different application programs corresponding to a plurality of different service codes, and also stores a plurality of issue certificates corresponding to a plurality of application programs, the plurality of issue certificates are certificates on which issue processing is performed based on an issue-management table of a different first memory device, and have a digital signature by a private key peculiar to a different first memory device.

23. A memory device having data storage means and data control means, the memory device is defined as a child-memory device, the device comprising:
an application program, which is stored in the child-memory device, for executing data processing to which the child-memory device is applied;
an issue certificate having a digital signature by a private key associated with a parent memory device, for data including a service code for identifying the application program, wherein issue processing of the child-memory device or execution processing of the issue processing of the issue certificate for the child-memory device is performed based on an issue-management table from the parent memory device; and
tied information necessary for use of the child-memory device, the tied information being generated based on information extracted from both the parent memory device and the child-memory memory device, the tied information is generated in a format of a public key certificate, the generated tied information is stored in the child-memory device.

24. A memory device according to claim 23, wherein the issue certificate has a digital signature by a private key peculiar to the parent memory device for data which includes a service code for identifying data processing to which the memory device is applied, and an identification (ID) of the memory device.

25. A memory device according to claim 23, wherein the memory device stores an application program which executes a service corresponding to the service code, the application program includes a lower application program which executes data processing on the condition of authentication approval by a common-key system, and an upper application program which performs execution control of the lower application program.

26. A memory device according to claim 23, wherein the memory device stores an application program which executes a service corresponding to the service code, the memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition of the authentication approval.

27. A memory device according to claim 23, wherein the memory device stores an application program which executes a service corresponding to the service code, the memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition that the authentication is approved and the memory device identification (ID) of the memory device is not registered in a revocation list storing an identification (ID) of an illegal device.

28. A memory device according to claim 23, wherein the memory device stores an application program which executes a service corresponding to the service code, the memory device has a lower application program which executes data processing on the condition of authentication approval by a common-key system, and an upper application program which performs execution control of the lower application program, the upper application program executes authentication processing between the memory device and an entity management device, which is a service providing entity corresponding to the service code, by a public-key system, and controls to enable execution of the lower application program on the condition that the authentication is approved and a service code corresponding to the upper application program and a service code stored in the issue certificate are identical.

29. A data processing method for executing issue processing of a second memory device, or storage processing of an issue certificate for a second memory device based on a first memory device storage data, the method comprising:
    determining whether a second memory device issue processing based on an issue-management table, which is stored in the first memory device, concerning the second memory device, or storage processing of an issue certificate for a second memory device is allowed;
    generating an issue certificate on which a digital signature is executed by a private-key associated with the first memory device for data including a service code for identifying the application program stored in a second memory device;
    storing the certificate in the second memory device;
    generating tied information necessary for use of the second memory device based on information extracted from both the first memory device and the second memory device, the tied information is generated in a format of a public key certificate; and
    storing the generated tied information in the second memory device.

30. A data processing method according to claim 29, wherein the issue-management table stored in the first memory device is a table on which the service code and the second memory device or an issue upper limit number of the issue certificates, and a number of already issued correspond with each other, the issue processing of the second memory device or the issue certificate is executed on the condition that data on the issue management table corresponding to a service code of the issue processing holds: a number of already issued<a number of issue upper limit.

31. A data processing method according to claim 29, wherein the second memory device issue processing or issue processing of the issue certificate is executed on the condition of at least either authentication between the first memory device and the second memory device by a public-key cryptography is approved, or authentication between the first memory device and a device for executing the issue processing of the second memory device, or issue processing of the issue certificate by a public-key cryptography is approved.

32. A data processing method according to claim 29, wherein the second memory device issue processing or issue processing of the issue certificate is executed on the condition that the memory device identification (ID) of the first memory device is not registered in a revocation list storing an identification (ID) of an illegal device.

33. A data processing method according to claim 29, wherein the second memory device issue processing or issue processing of the issue certificate is executed on the condition of at least either authentication between the parent memory device and the child memory device by a public-key cryptography is approved, or authentication between the first memory device and a device for executing the issue processing of the second memory device, or issue processing of the issue certificate by a public-key cryptography is approved.

34. A data processing method according to claim 29, wherein the issue certificate stored in the second memory device has a digital signature by a private key peculiar to the first memory device for data which includes a service code for identifying data processing to which the second memory device is applied, and an identification (ID) of the second memory device.

* * * * *